(12) United States Patent
Hachenberger et al.

(10) Patent No.: US 11,147,410 B2
(45) Date of Patent: Oct. 19, 2021

(54) DEVICE AND METHOD FOR PREPARING A BEVERAGE, IN PARTICULAR FOR PREPARING A PROTEIN-CONTAINING MIXED BEVERAGE

(71) Applicant: HACHENBERGER & RATZOW GBR, Zwickau (DE)

(72) Inventors: Steve Hachenberger, Zwickau (DE); Daniel Ratzow, Werdau (DE)

(73) Assignee: Hachenberger & Ratzow GbR

(*) Notice: Subject to any disclaimer, the term of this patent is extended or adjusted under 35 U.S.C. 154(b) by 211 days.

(21) Appl. No.: 15/756,190

(22) PCT Filed: Aug. 29, 2016

(86) PCT No.: PCT/EP2016/070300
§ 371 (c)(1),
(2) Date: Feb. 28, 2018

(87) PCT Pub. No.: WO2017/037008
PCT Pub. Date: Mar. 9, 2017

(65) Prior Publication Data
US 2018/0235397 A1  Aug. 23, 2018

(30) Foreign Application Priority Data
Sep. 1, 2015 (DE) .................. 202015006170.2
Nov. 4, 2015 (DE) .................. 202015007626.2
(Continued)

(51) Int. Cl.
*A47J 31/40* (2006.01)
*A47J 31/00* (2006.01)
*A23L 2/66* (2006.01)

(52) U.S. Cl.
CPC ............. *A47J 31/404* (2013.01); *A23L 2/66* (2013.01); *A47J 31/002* (2013.01); *A47J 31/40* (2013.01);
(Continued)

(58) Field of Classification Search
CPC ........ A47J 31/40; A47J 31/404; A47J 31/002; A47J 31/402; A23L 2/66; A23V 2002/00
(Continued)

(56) References Cited

U.S. PATENT DOCUMENTS 3,958,033 A * 5/1976 Sims ............... A23C 11/10
                                        426/602
4,500,549 A * 2/1985 Crossman ......... A23C 21/02
                                         426/33
(Continued)

FOREIGN PATENT DOCUMENTS

CN   103346163   10/2013
CN   104254269   12/2014
(Continued)

OTHER PUBLICATIONS

International Search Report prepared by the European Patent Office dated Sep. 30, 2016, for International Application No. PCT/EP2016/070300.
(Continued)

*Primary Examiner* — Dana Ross
*Assistant Examiner* — Kuangyue Chen
(74) *Attorney, Agent, or Firm* — Sheridan Ross PC

(57) ABSTRACT

The invention relates to a device for preparing a beverage having the following: a mixing device; a first container for storing a pourable substrate; a first supply device which is provided for supplying the pourable substrate out of one of the first containers to the mixing device; a second container for storing an at least substantially liquid substrate; a second
(Continued)

Figure 1A:
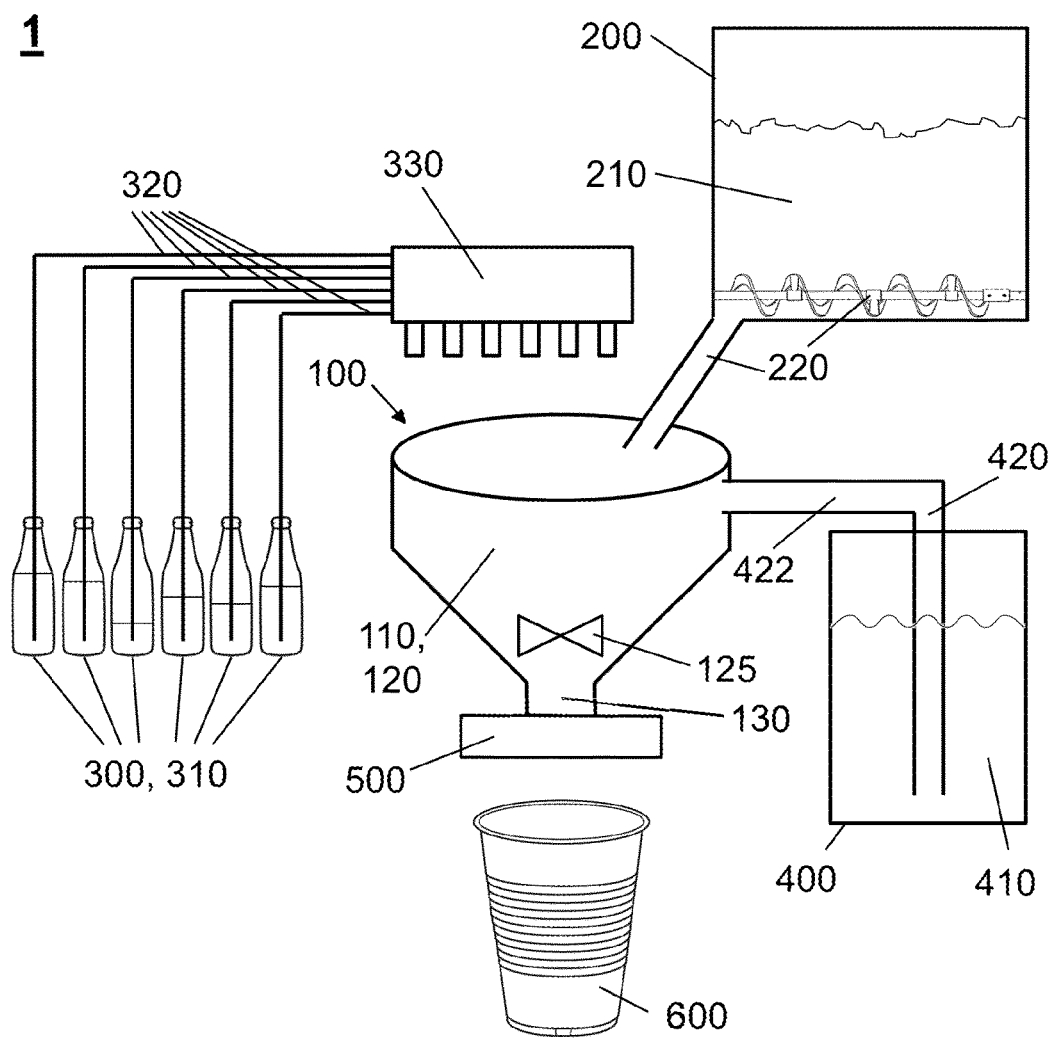

supply device which is provided for supplying the at least substantially liquid substrate from one of the second containers to the mixing device; a third supply device which is provided for supplying a carrier liquid to the mixing device; and a dispensing device which is provided for dispensing the beverage into a container. The invention further relates to a method for preparing a beverage, to a device for storing and supplying a pourable substrate, and to a method for assembling the device for storing and supplying a pourable substrate.

26 Claims, 15 Drawing Sheets

(30) Foreign Application Priority Data

Feb. 5, 2016 (DE) .......................... 202016000769.7
May 24, 2016 (DE) .......................... 202016003314.0

(52) U.S. Cl.
CPC .......... *A47J 31/402* (2013.01); *A23V 2002/00* (2013.01)

(58) Field of Classification Search
USPC ........................................... 99/275
See application file for complete search history.

(56) References Cited

U.S. PATENT DOCUMENTS

| 4,804,022 | A | * | 2/1989 | Berger | ................ F16H 25/2015 141/164 |
| 10,450,731 | B2 | * | 10/2019 | McHale | .................. E03C 1/046 |
| 2004/0071841 | A1 | | 4/2004 | Carhuff et al. | |
| 2010/0187259 | A1 | * | 7/2010 | Lussi | ...................... A47J 31/40 222/129.4 |
| 2013/0047558 | A1 | * | 2/2013 | Hogan | ................ B65D 21/022 53/471 |
| 2014/0030415 | A1 | * | 1/2014 | Chamoin | ............. A23C 9/1548 426/585 |

FOREIGN PATENT DOCUMENTS

EP         2011421       1/2009
WO    WO 2013/131722    9/2013

OTHER PUBLICATIONS

Official Action with English Translation for China Patent Application No. 201680051227.6, dated Nov. 10, 2020, 15 pages.
English Translation of the Examiner's Comments on claims 21-27 for China Patent Application No. 201680051227.6 Official Action, dated Nov. 10, 2020.

* cited by examiner

DEVICE AND METHOD FOR PREPARING A BEVERAGE, IN PARTICULAR FOR PREPARING A PROTEIN-CONTAINING MIXED BEVERAGE

CROSS REFERENCE TO RELATED APPLICATIONS

This application is a national stage application under 35 U.S.C. 371 and claims the benefit of PCT Application No. PCT/EP2016/070300 having an international filing date of 29 Aug. 2016, which designated the United States, which PCT application claimed the benefit of German Patent Application No. 20 2015 006 170.2 filed 1 Sep. 2015; German Patent Application No. 20 2015 007 626.2 filed 4 Nov. 2015; German Patent Application No. 20 2016 000 769.7 filed 5 Feb. 2016; and German Patent Application No. 20 2016 003 314.0 filed 24 May 2016, the disclosures of each of which are incorporated herein by reference.

The present invention relates to an apparatus and a method for preparing a beverage, in particular for preparing a protein-containing mixed beverage. The present invention further relates to an apparatus for storing and supplying a pourable substrate which is in particular used in the above-cited apparatus for preparing a beverage.

In developing such an apparatus for preparing a beverage, in particular for preparing a protein-containing mixed beverage as, for example, a beverage dispenser, one is always caught in a trade-off between product variety, beverage quality, hygienic requirements, ease of maintenance, (maximum possible) maintenance intervals, availability and cost-effectiveness. In particular in terms of the hygienic requirements, the highest standards should be met.

An apparatus for preparing protein-containing mixed beverages, as are frequently found for example in fitness studios, should be able to provide different flavors of protein-containing mixed beverages depending on the athlete's preference. This is currently frequently realized by a pourable substrate being provided for each flavor which is mixed with water and dispensed at the athlete's option. Due to the limited available space inside a beverage dispenser, this can result in deficiencies in the product variety, ease of maintenance, maintenance intervals, availability and/or cost-effectiveness.

The present invention thus addresses the task of specifying apparatus and/or methods with which beverages can be economically and hygienically prepared.

This task is solved according to the invention by an apparatus for preparing a beverage, in particular for preparing a protein-containing mixed beverage, in accordance with claim 1. One preferential method for preparing a beverage, in particular for preparing a protein-containing mixed beverage, constitutes the subject matter of claim 13. The task is furthermore solved by an apparatus for storing and supplying a pourable substrate in accordance with claim 19 and a method for assembling an apparatus for storing and supplying a pourable substrate in accordance with claim 24. Preferential further developments of the invention constitute the subject matter of the subclaims.

With the appropriate configuration, the inventive apparatus for preparing a beverage, in particular for preparing a protein-containing mixed beverage, allows for accommodating the above-cited trade-offs particularly auspiciously.

The basic idea of the invention is based on utilizing a pourable substrate which in particular provides an at least substantially consistent flavor base which can be individualized by adding at least one substantially liquid substrate, in particular in the form of a flavor.

The inventive apparatus thus has the advantage of fewer initial containers needing to be provided, in particular only one first container can be provided in which a pourable substrate is stored. In so doing, the space gained inside the apparatus from eliminating at least some of the containers as per the prior art, which in each case provides one pourable substrate of defined flavor, can preferably be used to increase the volume and/or remaining containers which, among other things, contributes to extending the maintenance and/or refilling intervals. Furthermore, a larger first container can also contribute to lowering the apparatus operating costs since economies of scale can be leveraged during the production and packaging of the pourable substrate.

The inventive apparatus is further advantageous because the properties of the beverage to be prepared can be efficiently adjusted when the substantially liquid substrate is provided in a second container, and in particular in multiple second containers. The liquid substrates can for example be highly concentrated syrup from which a small volume readily suffices to e.g. modify the taste of a prepared beverage. A plurality of compact second containers can be kept within the apparatus so as to be able to provide a very wide range of product variety.

Within the meaning of the present invention, an "apparatus for preparing a beverage" is in particular understood as a manual, semi-automated or fully automated beverage preparation apparatus, in particular a beverage dispenser. The beverage is thereby at least partly prepared inside the apparatus during the course of a so-called post-mix method. Apparatus which exclusively dispense ready-made beverages prepared in a so-called premix method in removable containers, for example cups, or pre-filled containers, for example bottles or beverage cans, are explicitly not included.

Within the meaning of the present invention, "proteins" are in particular biological macromolecules composed of amino acids. "Proteins" and "protein substances" are understood as being analogous terms. The building blocks of protein are defined as proteinogenic, thus protein-creating, designated amino acids joined into chains by peptide bonds. Of particular importance here are the eight essential designated amino acids which the body itself cannot manufacture but instead needs to absorb from food. Amino acid chains can be up to several thousand amino acids long, whereby amino acid chains longer than approximately 100 amino acids are referred to as proteins. As defined by the present invention, however, also shorter chain peptides are included as proteins.

Within the meaning of the present invention, "protein-containing mixed beverage" is in particular understood as a liquid suitable for consumption, in particular by humans, and which comprises proteins, in particular at a volume of more than 2% by weight relative to the total weight of the beverage. Furthermore, the "protein-containing mixed beverage" within the meaning of the present invention is a liquid composed of several components which are mixed together prior to consumption, in particular just prior to consumption.

Within the meaning of the present invention, a "mixing device" is in particular understood as a device which is provided to mix together at least two starting substances, in particular at least three starting substances, in particular one pourable substrate, one at least substantially liquid substrate and one carrier liquid. A mixing device within the meaning of the present invention can optionally furthermore be provided to collect the starting substances prior to mixing and/or dispense them after mixing. The mixing device according to the invention comprises in particular a mixing body such as a mixer wheel and/or screw and/or propeller.

Within the meaning of the present invention, a "container" is in particular understood as a receptacle that is limited in at least five of the six directions of spatial extension as per the Cartesian coordinate system. The fifth direction can be open, in particular as a floor having a valve or respectively a side wall having a valve, for a limited time period over at least part of the delineating surface in said direction of extension, particularly at least substantially perpendicular to the direction of extension, in order to render the discharge of the medium, in particular substrate and/or carrier liquid, stored in the container. Furthermore, the container can also be limited in the sixth direction of extension, in particular in the form of a separate cover or an integrated cover surface in order to prevent the entry of foreign bodies from outside the container.

Within the meaning of the present invention, a "pourable substrate" is in particular understood as a substance consisting of fine solids, in particular a fine powder, powder or granulates.

Within the meaning of the present invention, a "liquid substrate" is in particular understood as a substance which exhibits virtually no resistance to a change in form at the defined ambient temperature of 20° C. albeit quite a large resistance to a change in volume. A liquid substrate is in particular to be understood as all those substances which exhibit a dynamic viscosity η of up to $10^8$ mPa*s at room temperature.

Within the meaning of the present invention, a "carrier liquid" is in particular understood as a liquid which, due to its intrinsic properties, is suited to at least partially dissolving a pourable and/or an at least substantially liquid substrate. Carrier liquids in the sense of the prevent inventions are in particular all forms of water with or without additives as well as all types of colloidal dispersions of proteins, lactose and butterfat in water such as milk, for example.

Within the meaning of the present invention, a "supply device" is in particular understood as a device which is involved in conveying a substrate or the carrier liquid to the mixing device, in particular establishing the connection to the mixing device, particularly from a container and/or a line, particularly a water line. Supply devices can comprise passive components such as, for example, chutes, tubes or hoses and/or active components such as, for example, valves, gates or conveyor devices, in particular pumps, screw conveyors or the like.

Within the meaning of the present invention, a "dispensing device" is in particular understood as a device which is involved in conveying the beverage to a container, particularly one which can be removed out of or from the apparatus, in particular establishing the connection from the mixing device to the container which is in particular removable from/out of the apparatus. The dispensing device can comprise passive components such as, for example, funnels, nozzles, tubes or hoses and/or active components such as, for example, valves, gates, foaming devices or conveyor devices, in particular pumps, screw conveyors or the like, and/or cleaning devices.

Within the meaning of the present invention, a "pre-flow" is in particular understood as a feed, in particular exclusively of a cleaning fluid and/or preferentially the carrier liquid in advance of the mixing in order to clean and/or prepare the mixing device prior to the substrate being supplied, in particular by wetting the mixing device so as to prevent the supplied substrates from clumping and/or adhering during mixing. After passing through the mixing device, the liquid used for the pre-flow, particularly in the case of a carrier liquid being used, can thereby either be dispensed into the container which is in particular removable from/out of the apparatus or into a further container integrated into the apparatus and/or to an in particular external drain.

Within the meaning of the present invention, a "post-flow" is in particular understood as a feed, in particular exclusively of a cleaning fluid and/or preferentially the carrier liquid subsequent the mixing in order to clean the mixing device after the substrate being supplied. After passing through the mixing device, the liquid used for the post-flow, particularly in the case of a carrier liquid being used, can thereby either be dispensed into the container which is in particular removable from/out of the apparatus or into a further container integrated into the apparatus and/or to an in particular external drain.

According to one preferential embodiment, the mixing device comprises: a collecting section which is provided to bring together the pourable substrate, the at least substantially liquid substrate and the carrier liquid; a mixing section which is provided to mix the pourable substrate, the at least substantially liquid substrate and the carrier liquid into the in particular at least substantially homogeneous beverage; and a dispensing section which is provided to dispense the in particular at least substantially homogeneous beverage to the dispensing device, wherein preferentially at least two sections of the group consisting of collecting section, mixing section and dispensing section form one unit.

This enables two different types of the mixing device to be realized: The mixing device is either a continuous mixer or a sequential mixer as will be described further below. The continuous mixer is characterized by the fact that no active element such as e.g. a valve is required between the mixing section and the dispensing section; in particular a tube and/or hose section is sufficient. The carrier liquid is mixed with the supplied substrates at the moment the mixture passes through the mixing section on its way from the collecting section to the dispensing section, in particular by taking advantage of gravity. Preferentially, there is consequently always only a partial volume of the finished beverage in the mixing device, which results in it being able to be advantageously realized compactly.

According to one preferential embodiment, the mixing device and the dispensing device are separated from each other by an in particular electrically controllable valve which has at least one open position and one closed position. Pursuant to this implementation, the mixing device is preferentially operated as a sequential mixer. That means that the carrier liquid is first mixed with the substrates to the at least substantially entire requested beverage volume before being dispensed to the athlete via actuation of the valve. This can achieve, particularly in the case of the athlete being able to observe the beverage being filled into the container which is then removable from or out of the apparatus, being able to dispense an at least substantially visually homogeneous, in particular homogeneous mixture over the course of the entire filling period, which can give the beverage a higher value in the eyes of the athlete.

According to one preferential embodiment, the at least one of the at least one first supply devices comprises a component, in particular formed as a component selected from a group comprising a screw conveyor, powder chute, conveyor belt, hose pump and/or pneumatic conveyor device, in particular a suction conveyor device, vacuum conveyor device and/or blower device.

Individual pourable substrate particles can adhere to each other, which can lead to their solidification. This has the effect of a pourable substrate frequently not being able to be extracted from a container in solely passive manner utilizing the force of gravity but rather preferentially being actively supported. This has the advantage of being able to ensure a supply of pourable substrate, particularly at least substantially in the requested volume, at least substantially independent of the consistency of the pourable substrate in the first container.

According to one preferential embodiment, the carrier liquid has a water content of between 50% and 100% by weight and/or a milk content of between 0% and 100% by weight, in particular between 0% and 50% by weight.

According to one preferential embodiment, the third supply device is connected to a drinking water supply and/or reservoir.

A drinking water connection is advantageous for the fact of the component of the beverage constituting the largest percentage by volume and/or weight, namely the carrier liquid, thus thereby not needing to be separately refilled. This leads to considerably extended replenishing intervals. The reservoir is advantageous in achieving increased flexibility in terms of the site of installation since no specific drinking water connection needs to be provided at the site of installation. According to a further preferential embodiment, the apparatus is configured to draw the carrier liquid both from the drinking water connection as well as from the reservoir depending on operating mode.

According to one preferential embodiment, the mixing apparatus comprises one or more, in particular electrically driven mixing bodies selected from among a group comprising: a propeller, a mixer wheel and/or a bladed mixing cone.

According to one preferential embodiment, the mixing device is configured to produce a carrier liquid vortex to which the pourable substrate and/or the at least substantially liquid substrate is fed.

The applicant has recognized that pourable substrates generally, and quite particularly the pourable substrates described further below as preferential at an at least 20% by weight of protein content, tend to clump together inside the mixing device, which leads to a compromising of the beverage quality and in the worst case, to a damaging of the apparatus if the clumps of pourable substrate block or gum up the mixing device. It is therefore particularly advantageous to in particular first produce a carrier liquid vortex to which the pourable substrate is then in particular fed, particularly over a period of 5 to 50 seconds, in particular at least substantially continuously. The pourable substrate is thereby given the opportunity to at least partially dissolve in the carrier liquid without clumping. The same also applies in a similar way to the supplying of the at least substantially liquid substrate, whereby a controlled delivery spaced out over a longer period of time as relates to clumping can thereby be eliminated by virtue of the different aggregate state. However, such a delivery is nevertheless advantageous since it benefits in particular the flavor homogeneity within the container removable from/out of the apparatus.

In accordance with one preferential embodiment, the apparatus comprises 2, 3, 4, 5, 6, 7, 8, 9 or more second containers and 2, 3, 4, 5, 6, 7, 8, 9 or more second supply devices, and at least two second supply devices are connected together by a joint dosing unit.

In particular, each of the second containers is connected to the mixing device by its own supply device. Varietal purity to the second substrates within the supply devices can thereby be largely precluded. Furthermore, simple control of the supply devices can thus be achieved since each supply device is only responsible for one specific second substrate. It can, however, be advantageous, due to the limited installation space near, in particular above the mixing device, for two or more supply devices to be combined at least in the area near the mixing device into one, in particular compact dosing unit which dispenses the respectively required second substrate in the desired volume to the mixing device.

According to one preferential embodiment, the at least one pourable substrate is an at least substantially protein-containing substrate and the at least one at least substantially liquid substrate is an at least substantially protein-free substrate.

In preparing a protein-containing mixed beverage, in particular protein shakes, at athletic training sites, the protein content of the prepared proteinaceous beverage often constitutes a key feature for consumers, this usually being associated with the highest possible protein content. The above-described embodiment is advantageous since it thereby achieves a division of functions between the pourable substrate and the at least substantially liquid substrate. While it is preferentially the function of the pourable substrate to define the protein content of the prepared protein-containing mixed beverage, it is preferentially the function of the at least substantially liquid substrate to dictate further characteristics of the protein-containing mixed beverage such as for example taste, color, consistency, foaming, etc.

According to one preferential embodiment, the at least one pourable substrate provides an at least substantially consistent flavor base and the at least one substantially liquid substrate a variation of the flavor.

That as noted above with respect to the division of functions also applies here as well. The at least substantially liquid substrate can for example be at least in part a highly concentrated syrup from which just a small volume suffices to modify the taste of the prepared beverage. A plurality of second containers can be compactly provided inside the apparatus so as to be able to offer a very wide range of product variety.

According to one preferential embodiment, the pourable substrate has a protein content of at least 20% by weight, preferentially at least 60% by weight, further preferentially at least 70% by weight, and most preferentially a protein content in the range of from 70% to 100% by weight.

A high protein content in the pourable substrate is advantageous for the reason of the protein content in the finished beverage thereby being higher and/or the volume of pourable substrate required to prepare the beverage being able to be reduced. The latter is in particular advantageous since the amount of pourable substrate provided in a defined volume thus lasts for an increased number of prepared beverages, which can extend maintenance and/or refilling intervals.

According to one preferential implementation, at least one first and/or at least one second container comprises an identification device which is provided, in particular configured, to identify, in particular categorically identify, the container. According to one preferential implementation, the apparatus is to that end provided, in particular configured, to receive and process data of the identification device. Preferentially, the identification device is to that end provided, in particular configured, to wirelessly exchange data with the apparatus unidirectionally or bidirectionally.

The identification device can transmit data selected from a group comprising: serial number, type identifier, batch identifier, best before date, running number of extractions, fill state, composition or the like. The identification device is for example configured as an RFID transponder (Radio Frequency IDentification). This enables preventing a substrate from being used which is not suitable for the apparatus. Moreover, ordering procedures for reordering substrate containers can be indicated in a timely manner or at least semi-automatically initiated.

According to one preferential implementation, the identification device is destroyed after the container has been completely emptied. Doing so prevents the container from subsequently being filled with a substrate having a composition dissimilar from the data of the identification device and is replaced.

According to one preferential implementation, the apparatus has a plurality, in particular 2, 3, 4, 5 or 6 first containers. This enables a replacement container, which is activated as soon as another first container is empty, to already be provided inside the apparatus. Alternatively and/or additionally, a pourable substrate having different intrinsic properties such as regards for example lactose content, protein content and/or composition can be provided in the further first container.

According to one preferential implementation, the third supply device is provided, in particular configured, to at least substantially laterally feed the carrier liquid of the mixing device; i.e. at least substantially parallel to an inner surface of the mixing device. This thereby at least encourages the formation of a carrier liquid vortex.

According to one preferential embodiment, the at least one second supply device is provided to feed the at least substantially liquid substrate to the mixing device via at least one component of the third supply device, in particular in the form of a tube or a hose section.

This is particularly advantageous pursuant to one implementation since it decreases the constructed size.

According to one preferential implementation, the joint dosing unit is arranged on the at least one component of the third supply device, in particular the tube or hose section, in particular directly. According to one implementation, the joint dosing unit is, in particular thereby configured, to dispense the at least substantially liquid substrate to the at least one component of the third supply device, in particular the tube or hose section.

According to one preferential implementation, the joint dosing unit is interposed between two components of the third supply device, in particular tube or hose sections, in particular integrated into a component of the third supply device, in particular the tube or hose section, or connected to the at least one component of the third supply device, in particular the tube or hose section, by only one tube or hose section or by a plurality of tube or hose sections, in particular by one respective tube or hose section for each at least substantially liquid substrate.

According to one preferential implementation, the at least one second supply device is connected, in particular directly; i.e. in particular without an interposed joint dosing unit, to the at least one component of the third supply device, in particular the tube or hose section.

According to one preferential implementation, the at least one second supply device and/or the joint dosing unit is provided to inject the at least substantially liquid substrate into the at least one component of the third supply device, in particular a tube or hose section.

According to one preferential implementation, the at least one component of the third supply device, in particular the tube or hose section, empties into the mixing device.

According to one preferential implementation, the apparatus furthermore comprises a sensor device which is configured to detect a position and/or a change in position of at least one element of the first supply device, in particular at least one chute.

Within the meaning of the present invention, a "sensor device" is in particular understood as a device consisting of at least one (measured variable) receiver which detects a physically measurable variable. The "sensor device" as defined by the present invention can comprise further measurement chain elements such as for example an amplifier, analog/digital converter, encoder, etc. Examples of sensor devices in the sense of the present invention are in particular optical induction switches, camera systems, radar sensors, thermal sensors, angle sensors, light barriers, in particular laser light barriers, etc.

This is in particular advantageous since the risk of clogging the collecting section and/or the mixing section can thus at least be lowered, in particular at least substantially prevented. According to one implementation, the element of the first supply device, in particular the chute, is swivel-mounted to the first supply device, particularly a housing of same, in particular to provide a locking mechanism for a refilling process. When the chute is pivoted from a closed position into an open position, a quantity of pourable substrate can undesirably pass into the collecting section and/or the mixing section, which can lead to clogging of the mixing section. For that reason, this embodiment provides for a sensor device, in particular in the form of an optical induction switch, which detects a respective pivoting of the chute, whereupon a flushing procedure is initiated, in particular by means of the third supply device which supplies the carrier liquid, in particular water, in order to at least substantially avoid, in particular prevent, clogging.

According to one preferential implementation, the first supply device has an opening on a housing side, in particular an opening able to be closed by a cover, which is configured such that, in particular when removed, the supply device is at least substantially completely purged of the pourable substrate located within said supply device.

This is in particular advantageous since the pourable substrate located in the supply device can in this way be removed prior to the first container being released from the first supply device. This is particularly advantageous as the assemblage of first container and first supply device is preferentially rotated by 180° when the first container is changed in order to set the assemblage onto a surface, e.g. a table, by the side of the first container opposite to the first supply device. To prevent uncontrolled and/or undesirable exiting of the pourable substrate from the supply device when the first supply device is released from the first container, the first supply device is first emptied through the opening. In particular, the cover is removed from the opening prior and/or subsequent to the draining, in particular prior to fitting back into the apparatus with the cover closed again.

A method according to the invention for preparing a beverage, in particular a protein-containing mixed beverage, and in particular for implementation in an apparatus of the above-described type, comprises the following steps:

(a) providing a carrier liquid, a pourable substrate and an at least substantially liquid substrate;

(b) feeding the carrier liquid, the pourable substrate and the at least substantially liquid substrate to a mixing device;

(c) mixing the carrier liquid, the pourable substrate and the at least substantially liquid substrate into a beverage, in particular an at least substantially homogeneous beverage, by means of the mixing device; and (d) dispensing the in particular at least substantially homogeneous beverage, wherein in particular at least steps (b) and (c) can be performed sequentially or in parallel or in alternating sub-steps or in any combination.

With respect to the resulting advantages, reference is made to the above remarks on the different embodiments of the apparatus so as to avoid repetition, these having exactly the same extent of applicability in the present respect.

According to one preferential embodiment, the method comprises the following sub-steps in chronological order, in particular in—apart from the restrictions listed below—exactly the following specified order:

Time point $t_1$: beginning the carrier liquid feed;

Time point $t_2$: beginning the carrier liquid vortex generating;

Time point $t_3$: beginning the pourable substrate feed and/or the feed of the at least substantially liquid substrate to the carrier liquid vortex;

Time point $t_4$: beginning the pourable substrate feed if the at least substantially liquid substrate feed began at time point $t_3$; or beginning the at least substantially liquid substrate feed if the pourable substrate feed began at time point $t_3$;

Time point $t_5$: terminating the pourable substrate and/or the at least substantially liquid substrate feed;

Time point $t_6$: terminating the pourable substrate feed if the at least substantially liquid substrate feed was terminated at time point $t_5$, or terminating the at least substantially liquid substrate feed if the pourable substrate feed was terminated at time point $t_5$;

Time point $t_7$: beginning generation of a post-flow, in particular by continuing the feed of carrier liquid, in particular without interruption;

Time point $t_8$: terminating the post-flow generation;

Time point $t_9$: terminating the carrier liquid vortex generation; and

Time point $t_{10}$: terminating the carrier liquid feed.

With respect to the resulting advantages, in particular as regards preventing clumping and attaining a very high hygienic level, reference is made to the above remarks on the different embodiments of the apparatus which have exactly the same extent of applicability in the present respect.

According to one preferential embodiment, a time period $t_2$ to $t_3$ has a length in the range of from 0.1 to 10 seconds; and/or a time period from the start of the pourable substrate feed to the end of the pourable substrate feed has a length in the range of from 5 to 120 seconds, preferentially in the range of 10 to 80 seconds, and particularly preferentially in the range of 25 to 60 seconds; and/or a time period $t_7$ to $t_8$ has a length in the range of from 1 to 10 seconds; and/or time period is precedes time period $t_4$ when the one substrate feed begun at time point $t_3$ is terminated prior to the start of the other substrate feed; and/or the time points $t_1$ and $t_2$ coincide; and/or the time points $t_3$ and $t_4$ coincide; and/or the time points $t_4$ and $t_5$ coincide; and/or the time points $t_5$ and $t_6$ coincide; and/or the time points $t_6$ and $t_7$ coincide; and/or the time points $t_8$ and $t_9$ coincide; and/or the time points $t_9$ and $t_{10}$ coincide; and/or the time points $t_8$ and $t_{10}$ coincide.

According to one preferential embodiment, the time period from the beginning of the pourable substrate feed $t_{Begin}$ to the end of the pourable substrate feed $t_{End}$ results as a function of the volume of the beverage to be dispensed, in particular at least substantially from the relationship: $t_{End} - t_{Begin} = x \cdot 1 \text{s}/10 \text{ ml}'$, preferentially with a range for x of 100 ml to 1000 ml.

The time period $t_2$ to $t_3$ is also referred to as pre-flow. The pre-flow serves to clean and/or prepare the mixing device prior to the feed of the substrates, in particular by wetting the mixing device so as to prevent the supplied substrates from clumping and/or adhering during mixing.

Preferentially the pourable substrate is supplied, as described above, in particular over a period of 5 to 120 seconds, in particular at least substantially continuously, so as to give the pourable substrate the opportunity to at least partly dissolve in the carrier liquid without clumping. Furthermore, the applicant discovered that the form in which the pourable substrate is supplied affects the creaminess of the resulting beverage as creaminess increases the longer amount of time one allows for the mixing in; i.e. the feed. Many athletes thereby enjoy increased creaminess, which increases the attractiveness of the product. It is furthermore advantageous to allow the time points of selected events to coincide in order to limit the period of time between the athlete selecting a beverage and the apparatus dispensing same.

According to one preferential implementation, the carrier liquid is supplied to the mixing device at least substantially laterally; i.e. at least substantially parallel to an inner surface of the mixing device. Doing so thereby at least promotes the formation of a carrier liquid vortex.

According to one preferential implementation, the at least substantially liquid substrate and the carrier liquid are supplied to the mixing device by at least one component of a third supply device, in particular in the form of a tube or hose section.

This is in particular advantageous according to one implementation since the limited space above the mixing device is thereby available for other components of the apparatus.

According to one preferential implementation, the at least one second supply device or the joint dosing unit directly delivers, in particular injects, the at least substantially liquid substrate into the at least one component of the third supply device, in particular the tube or hose section.

According to one preferential implementation, the at least substantially liquid substrate is fed to the at least one component of the third supply device by a tube or hose section, in particular a joint tube or hose section, wherein said tube or hose section is configured to conduct differing at least substantially liquid substrates.

According to one preferential implementation, the at least substantially liquid substrate is fed to the at least one component of the third supply device by a plurality of tube or hose sections, wherein each at least substantially liquid substrate is in particular provided its own tube or hose section.

One inventive use provides for utilizing the above-described apparatus in implementing the above-described method in the preparation of a beverage, in particular a protein-containing mixed beverage.

With respect to the resulting advantages, reference is made to the above remarks on the different embodiments of the apparatus and method which have exactly the same extent of applicability in the present respect.

The apparatus for the storing and supplying of a pourable substrate, in particular for use in an apparatus for preparing a beverage, in particular preparing a protein-containing mixed beverage, according to one of the herein described implementations comprises:

at least one first container for storage of a pourable substrate, wherein the first container comprises a mechanical interface;

at least one, in particular modular, first supply device which is provided to supply a mixing device with the pourable substrate from one of the first containers, wherein the supply device comprises:

a housing;

a mechanical seating which is arranged in and/or on the housing and which is connected to, in particular in engagement with, the mechanical interface of the first container; and a passive conveyor device which is arranged in and/or on the housing, in particular attached to same, and which is provided to supply the mixing device with the pourable substrate, in particular a defined volume of same.

This is in particular advantageous since it thereby enables simple preparation of the apparatus for storing and supplying a pourable substrate for use in the apparatus for preparing a beverage of the type described herein.

This is particularly because of the first container being able to be connected to the first supply device external of the apparatus for preparing a beverage and this assemblage then being inserted into the apparatus for preparing a beverage, which allows simple operation.

According to one implementation, it is thereby in particular possible for prefabricated first containers to be inserted upside down into the apparatus for preparing a beverage; i.e. with the in particular single opening aligned downward in the direction of gravity, in particular without dirtying the apparatus, particularly multiple apparatus. At the same time, it is in this way possible according to one implementation to at least supportively use gravity when extracting the pourable substrate.

According to one implementation, the apparatus for storing and supplying a pourable substrate comprises an active conveyor device which is at least partly arranged within the housing and which is provided to supply pourable substrate, in particular a defined volume of same, to the passive conveyor device.

This is advantageous according to one implementation since it thereby enables supporting or—depending on mounting orientation—overcoming the gravitational effect. In particular, it is also possible with appropriately designed active conveyor devices to extract residual quantities out of the first container and/or loosen the pourable substrate in case of solidification.

According to one implementation, the passive conveyor device comprises a component, formed in particular as a component selected from among a group comprising a powder chute, a chute, a hose section and/or a tube section; and/or the active conveyor device comprises a component, formed in particular as a component selected from among a group comprising a conveyor screw, a conveyor belt, a hose pump and/or a pneumatic conveyor device, in particular a suction conveyor device, vacuum conveyor device and/or blower device.

According to one implementation, the at least one pourable substrate is an at least substantially protein-containing substrate and the at least one at least substantially liquid substrate is an at least substantially protein-free substrate.

According to one implementation, the pourable substrate has a protein content of at least 20% by weight, preferentially at least 60% by weight, further preferentially at least 70% by weight, and most preferentially a protein content in the range of from 70% to 100% by weight.

According to one implementation, the at least one pourable substrate provides an at least substantially consistent flavor base and the at least one at least substantially liquid substrate provides a variation of the taste, particularly in the form of a flavor.

In respect of further explanations of the different implementations described herein of the apparatus for storing and supplying a pourable substrate, in particular of advantages, reference is made to the above disclosure relative to the apparatus for preparing a beverage which are equally applicable here, if not otherwise obvious to one skilled in the art.

A method according to the invention for assembling an apparatus for storing and supplying a pourable substrate, in particular in accordance with one of the implementations described herein, and for mounting same into an apparatus for preparing a beverage, in particular for preparing a protein-containing mixed beverage, in particular in accordance with one of the implementations described herein, comprises the steps:

mechanically connecting a first container for the storage of a pourable substrate to an in particular modular first supply device which is provided to supply a mixing device with the pourable substrate from one of the first containers;

inserting the assemblage produced by the mechanical connecting, comprising the first container and the first supply device, into the apparatus for preparing a beverage;

affixing, in particular attaching and/or inserting, a passive conveyor device to the first supply device for connecting the assemblage to the apparatus for preparing a beverage, in particular for preparing a protein-containing mixed beverage.

This is in particular advantageous since it thereby enables the first container to be hygienically inserted into the apparatus for preparing a beverage. It in particular dispenses with a laborious refilling of a container fixedly integrated into the apparatus for preparing a beverage; contaminating of the interior of the apparatus for preparing a beverage is moreover reduced, in particular prevented.

According to one implementation, the first container is seated with the opening facing upward during the assembly of the apparatus for storing and supplying a pourable substrate.

According to one implementation, after the first container is opened, the first, in particular assembled, supply device is mechanically connected to the first container, in particular the first supply device is screwed onto the first container.

According to one implementation, an outlet of the first supply device is closed by a stopper, in particular a plug. This is in particular advantageous since trickling out of the pourable substrate can thereby be at least lessened, in particular prevented, during the in particular subsequent inserting of the assemblage into the apparatus for preparing a beverage.

According to one implementation, the stopper is removed after the assemblage has been inserted prior to the passive conveyor device being affixed, in particular attached to and/or inserted into the first supply device for connecting the assemblage to the apparatus for preparing a beverage.

Figure 1B:
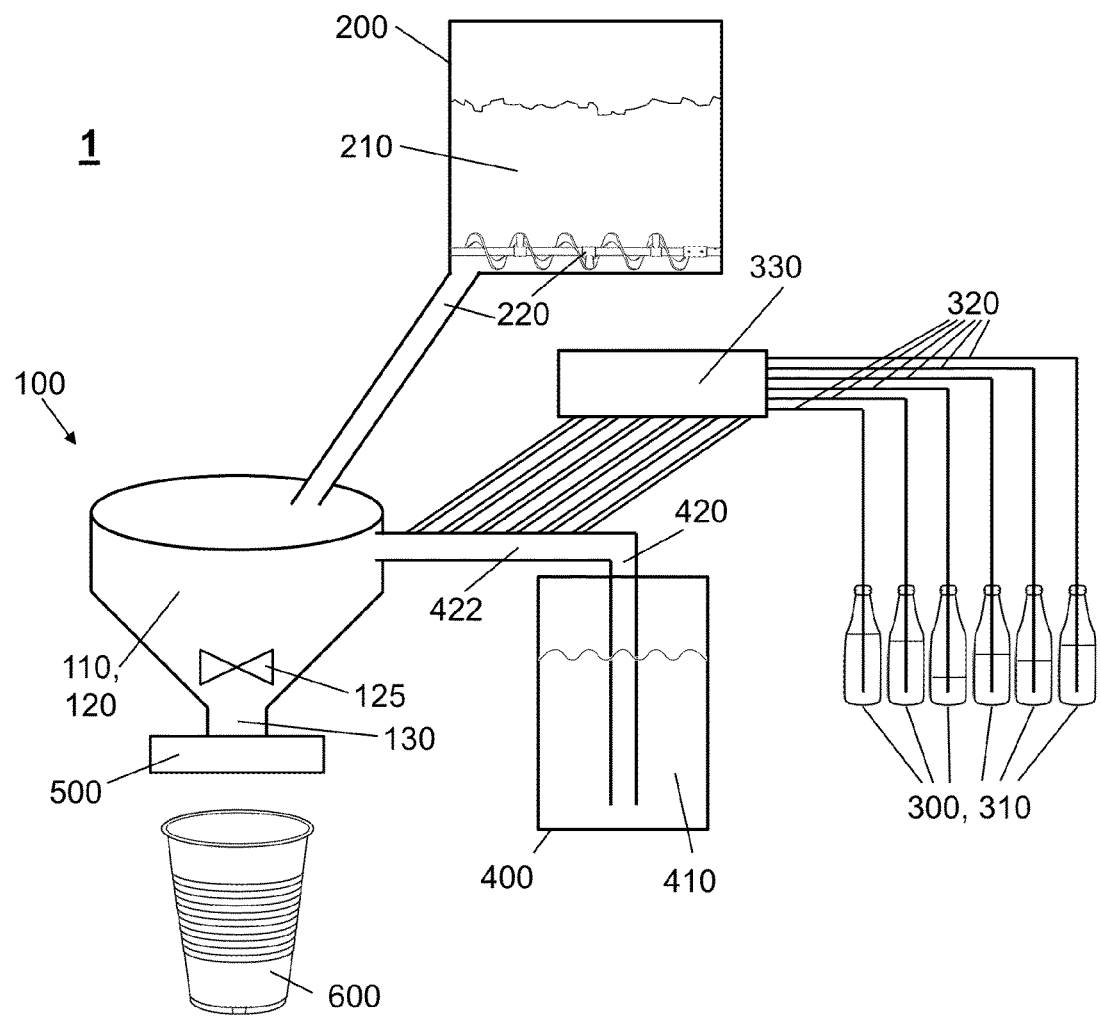
Figure 2:
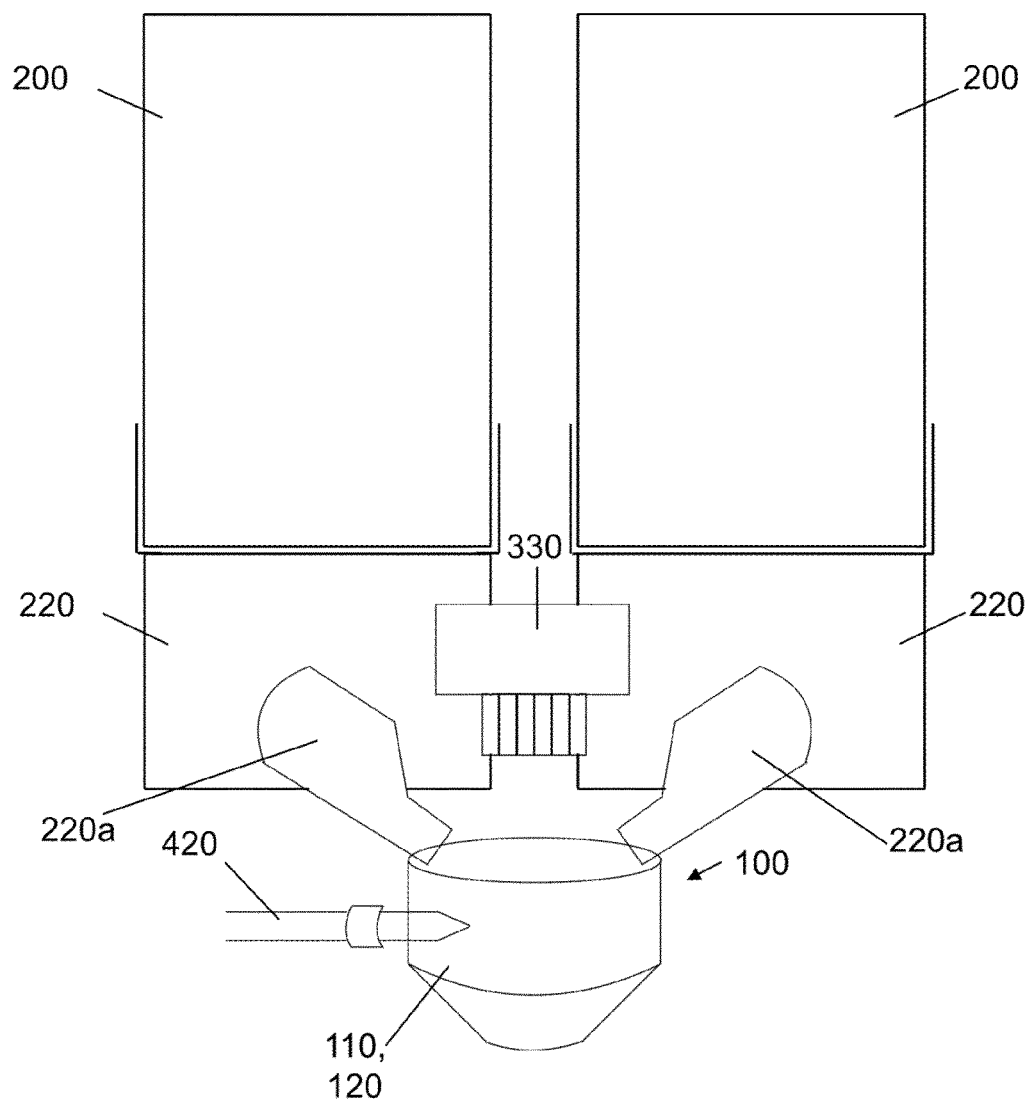
Figure 3:
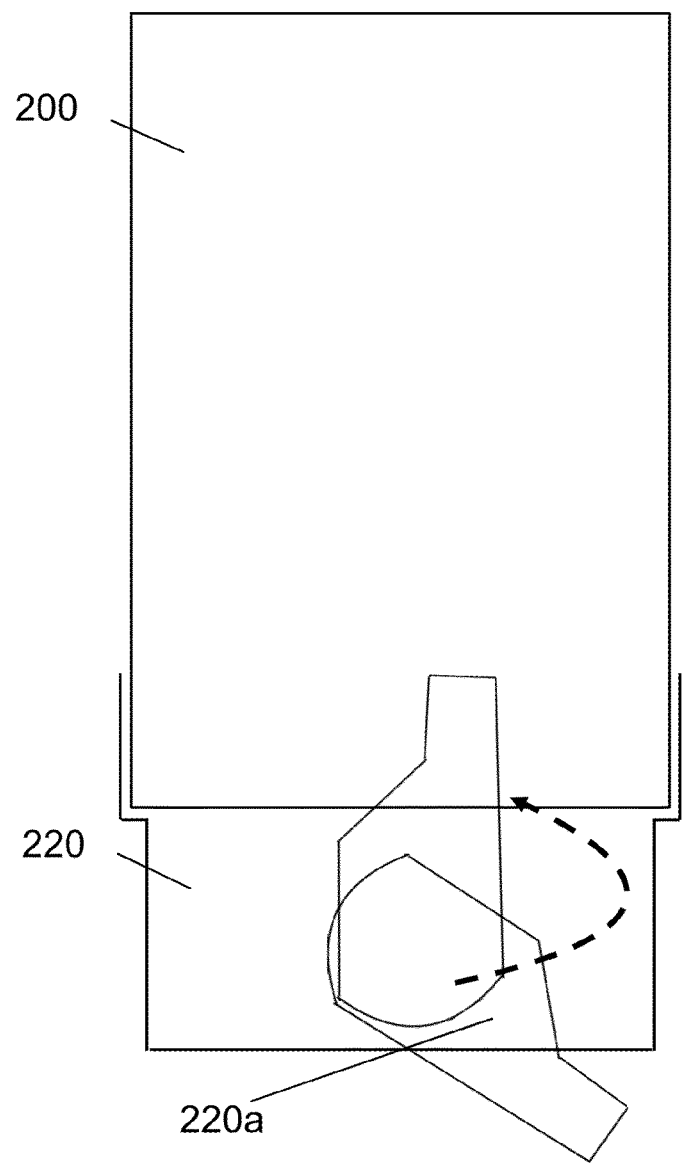
Figure 4:
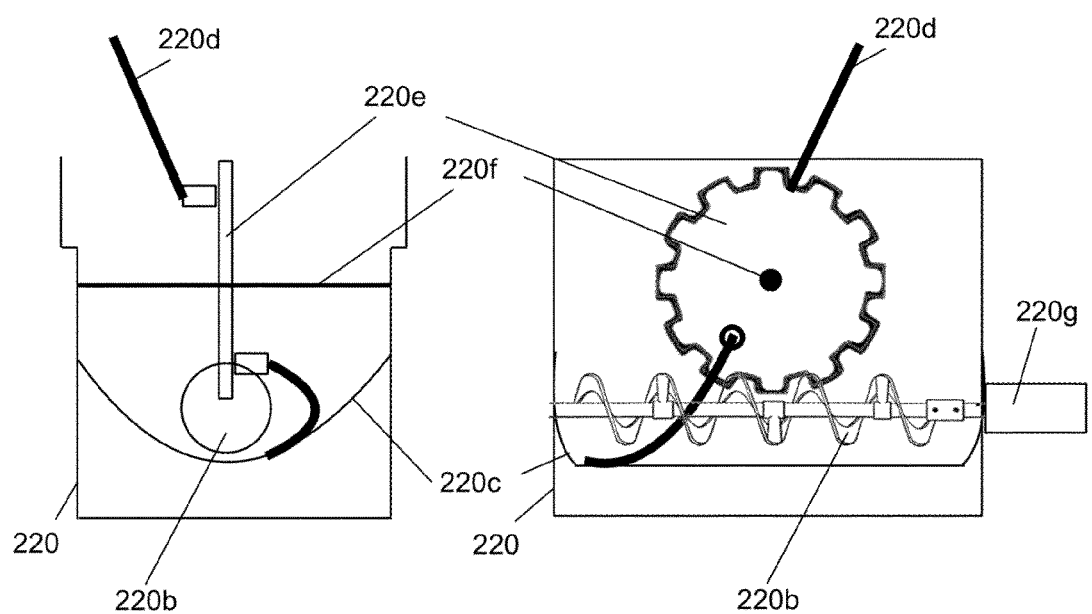
Figure 5:
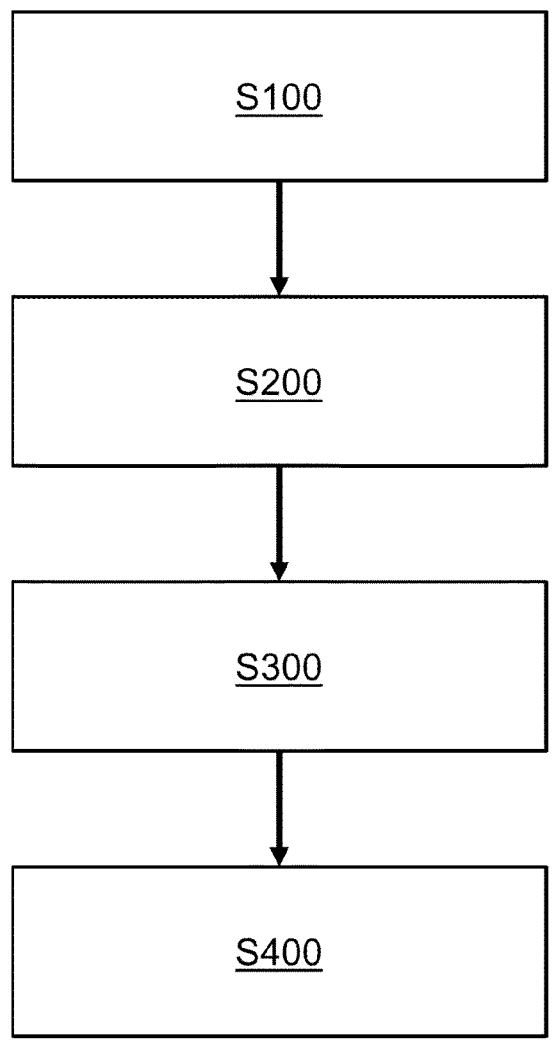
Figure 6:
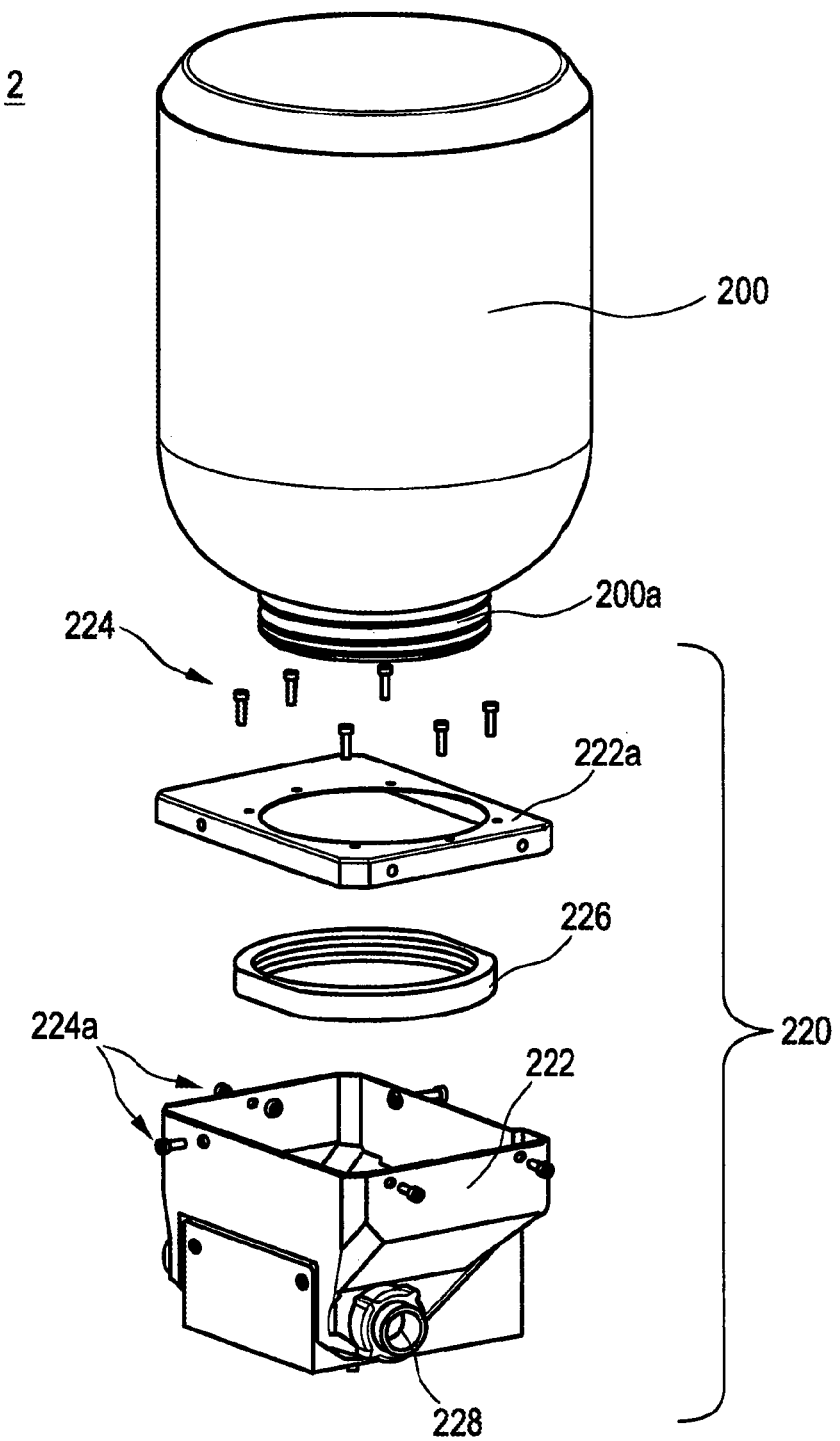
Figure 7:
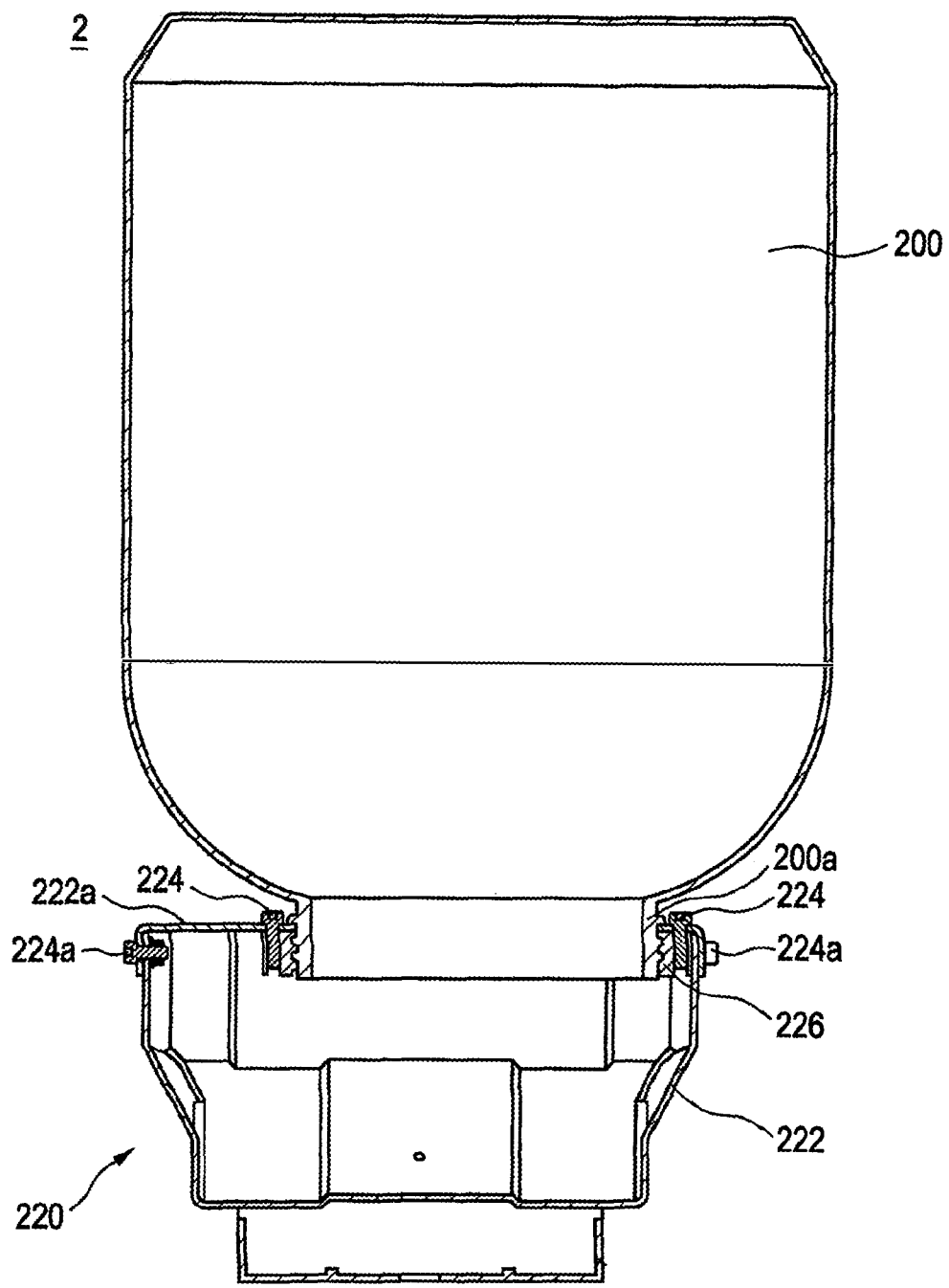
Figure 8:
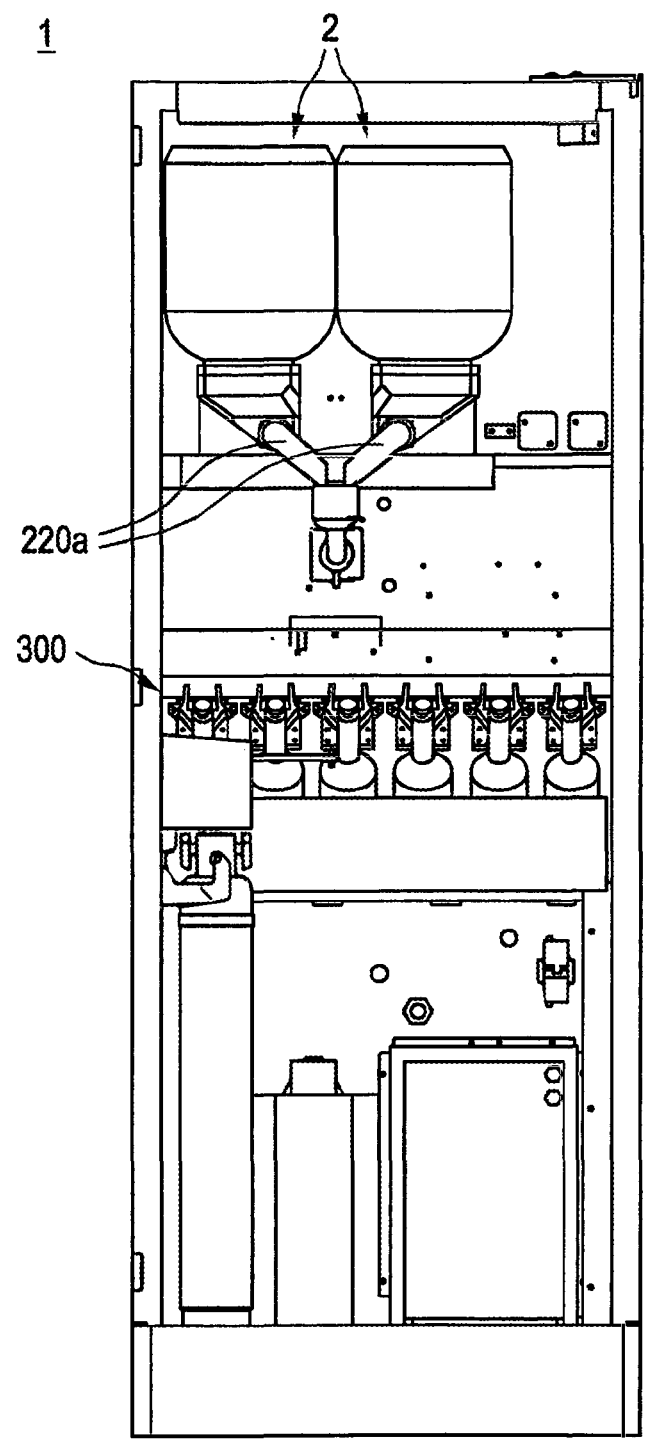
Figure 9:
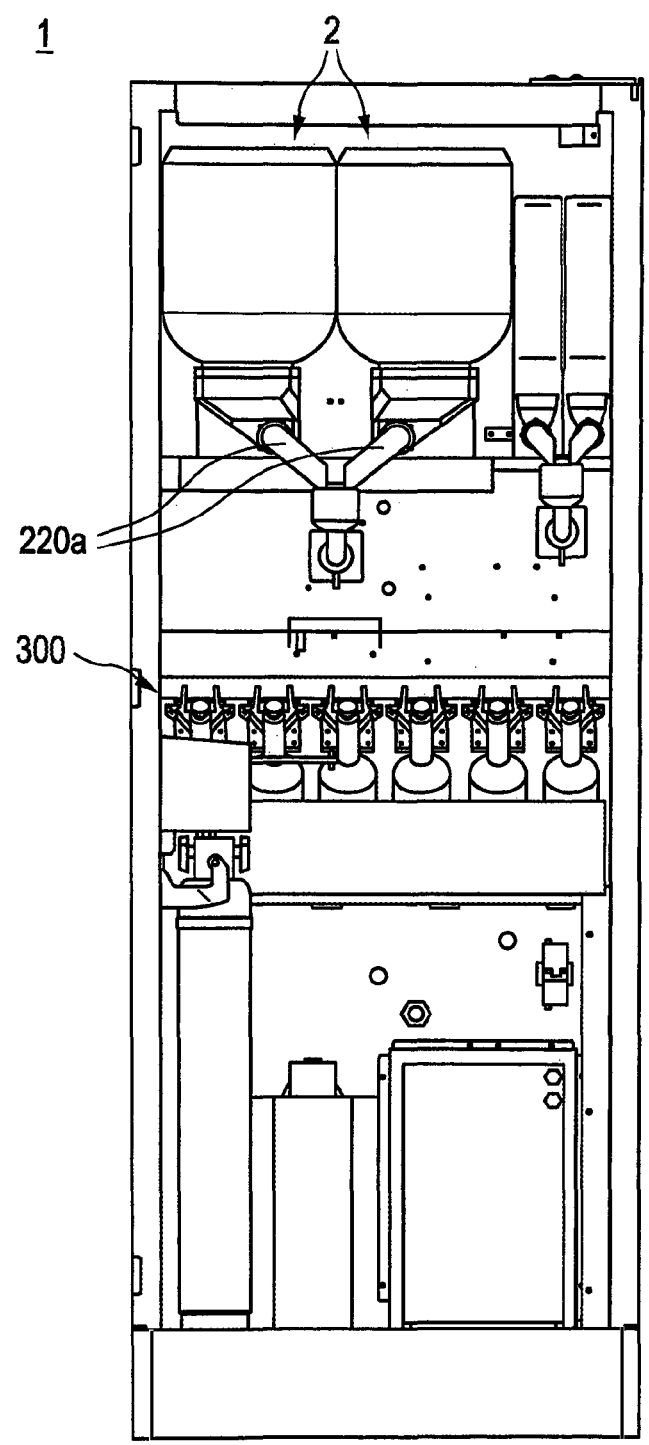
Figure 10:
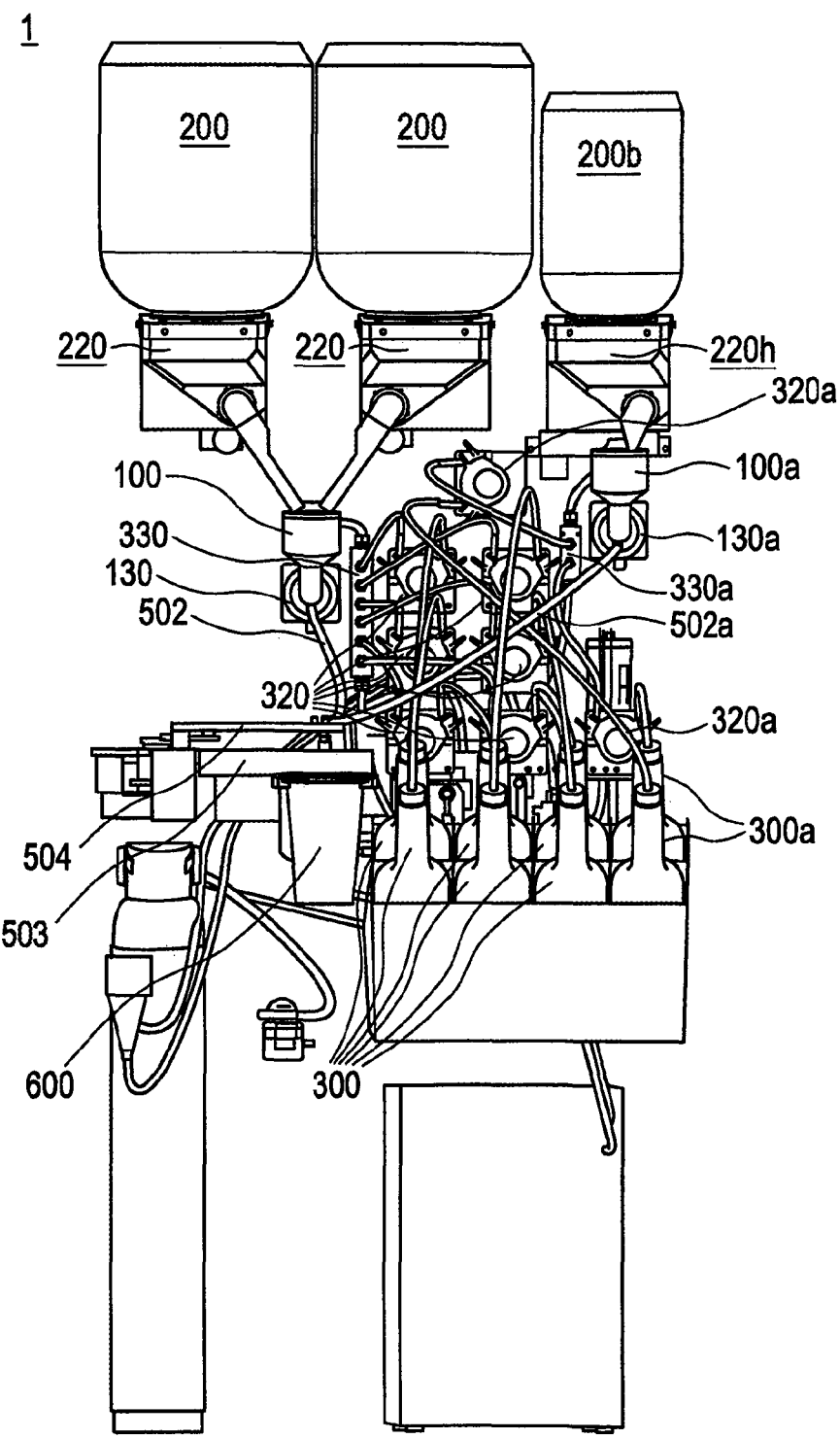
Figure 10A:
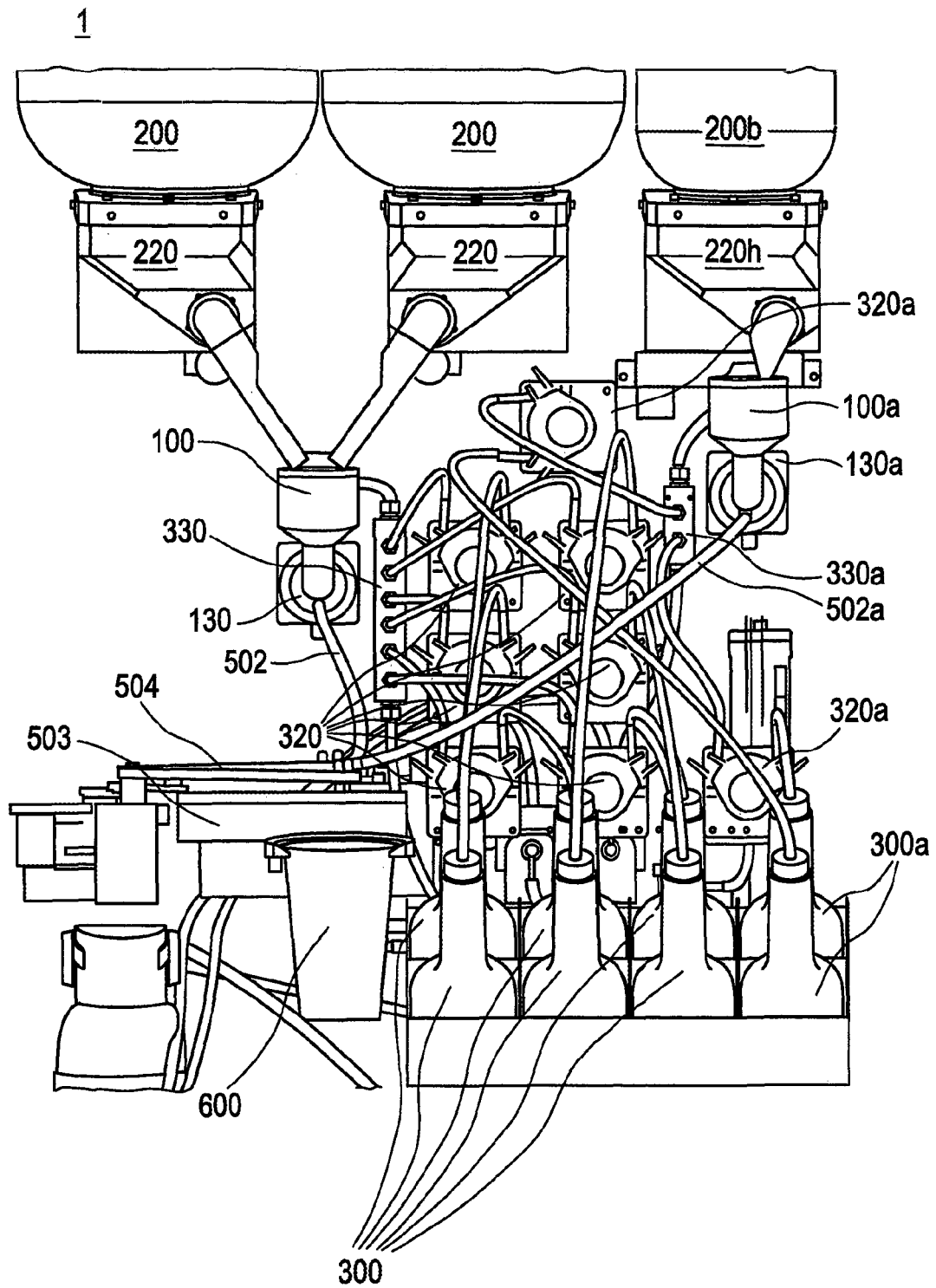
Figure 10B:
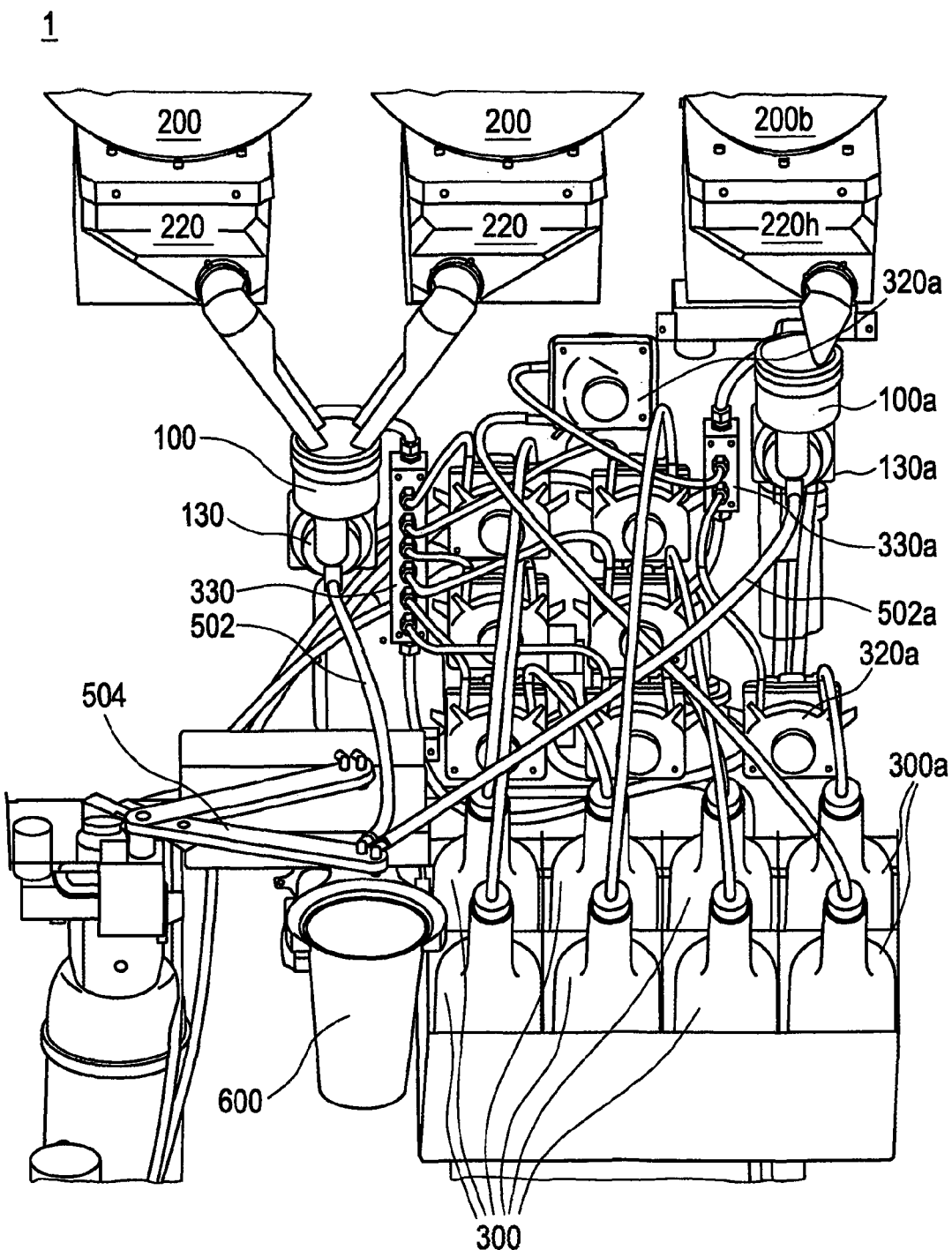
Figure 11:
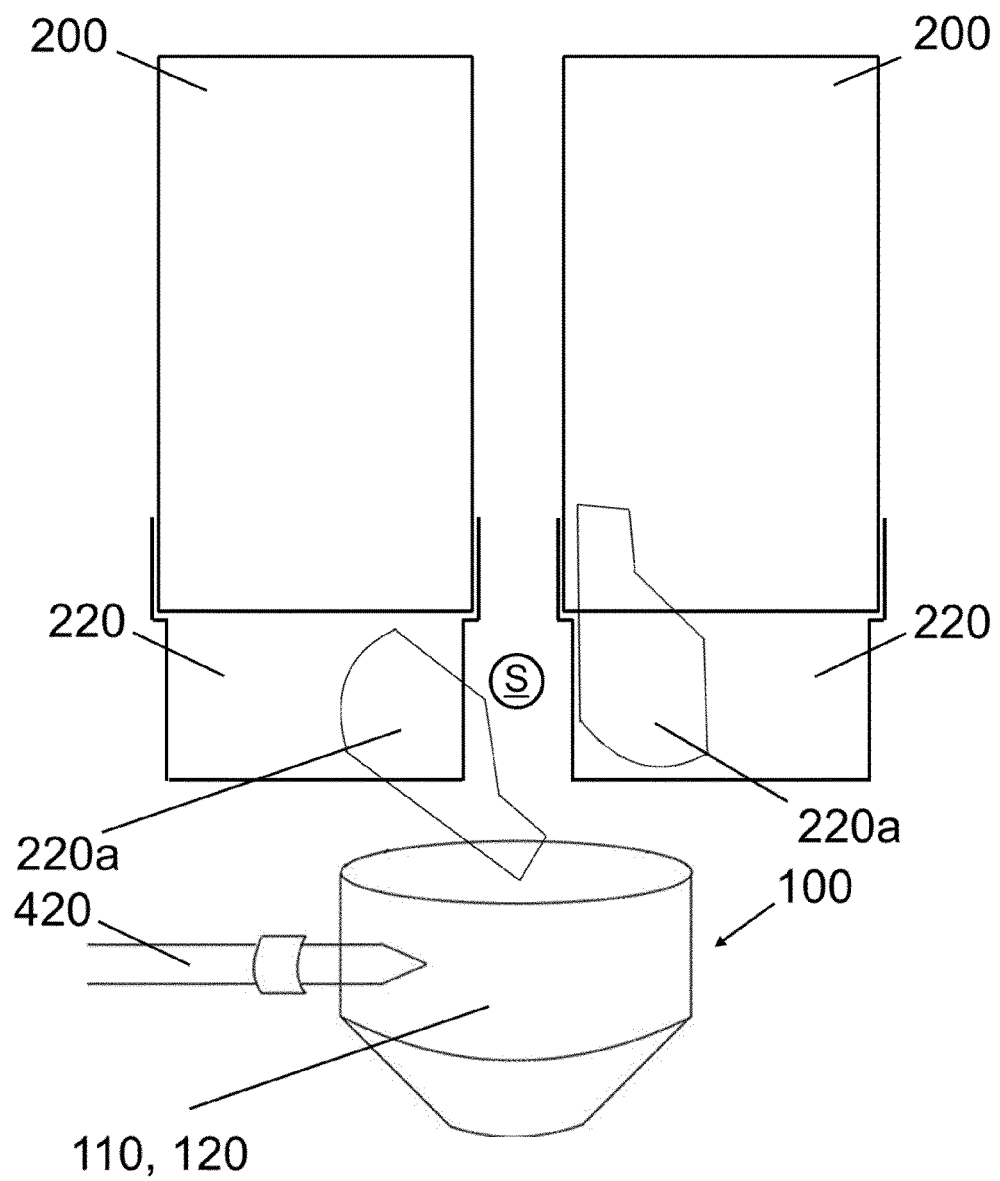
Figure 12:
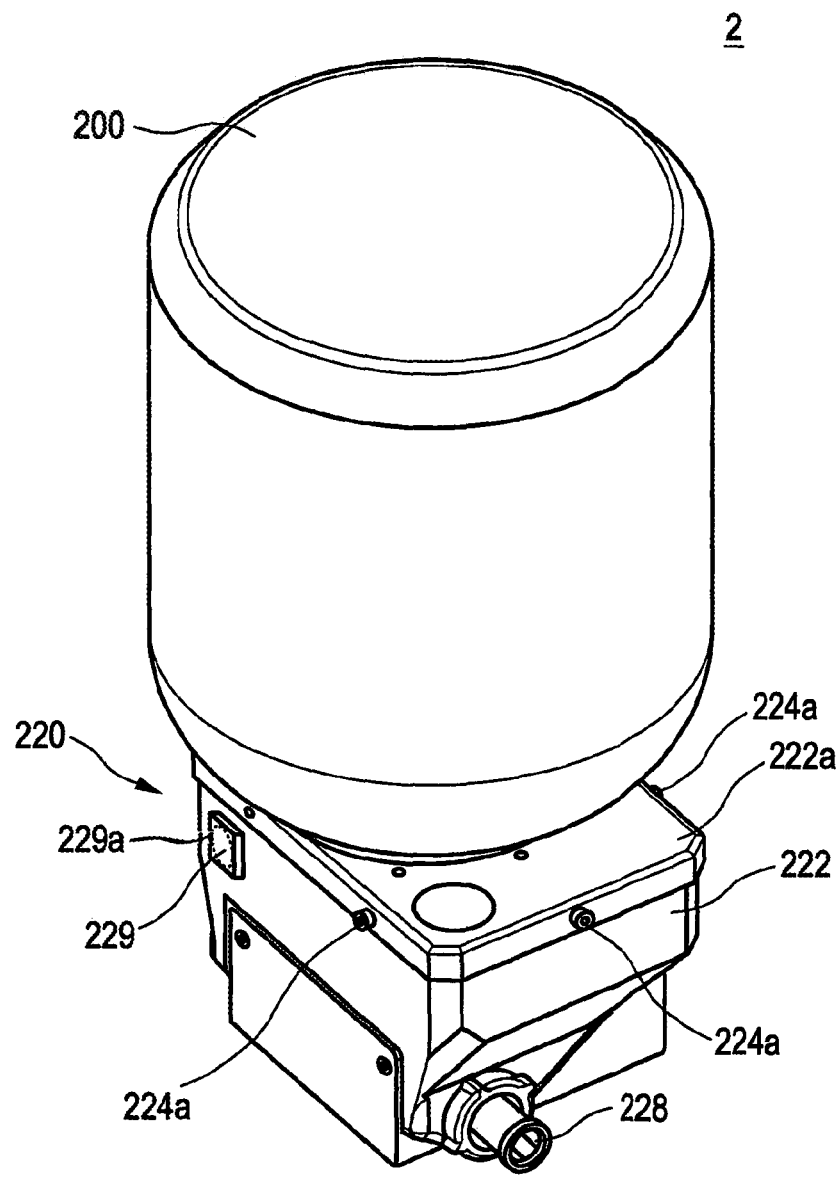

Additional advantageous further developments of the present invention are yielded by the subclaims and the following description of preferential embodiments. Thereby shown:

FIG. 1a a highly schematic view of one embodiment of the above-described inventive apparatus;

FIG. 1b a highly schematic view of a further embodiment of the above-described inventive apparatus;

FIG. 2 a highly schematic view of one part of a further embodiment of the above-described inventive apparatus;

FIG. 3 a highly schematic view of a first container according to one embodiment of the above-described inventive apparatus;

FIG. 4 a highly schematic view of a lower area of the first container according to one embodiment of the above-described inventive apparatus;

FIG. 5 a flow chart of the method according to the invention;

FIG. 6 an exploded view of one embodiment of an apparatus for storing and supplying a pourable substrate;

FIG. 7 a sectional view of the apparatus from FIG. 6 in the assembled state;

FIG. 8 a schematic view of one implementation of the interior of the apparatus for preparing a beverage;

FIG. 9 a schematic view of a further implementation of the interior of the apparatus for preparing a beverage;

FIG. 10 a schematic view of a further implementation of the interior space of the apparatus for preparing a beverage;

FIG. 10a a schematic partial view of the embodiment of FIG. 10;

FIG. 10b a schematic partial view of the embodiment from FIG. 10 tilted with respect to FIG. 10a;

FIG. 11 a highly schematic view of one part of a further embodiment of the above-described inventive apparatus; and FIG. 12 a schematic view of a further implementation of the apparatus for storing and supplying a pourable substrate.

FIG. 1a shows a highly schematic view of one example embodiment of the above-described inventive apparatus 1 for preparing a beverage, in particular for preparing a protein-containing mixed beverage.

The apparatus 1 comprises a mixing device 100, a first container 200, a plurality of second containers 300, a storage receptacle 400 and a dispensing device 500.

Further shown is a container 600 which is removable from and/or out of the apparatus, into which the beverage is dispensed, although which due to its removability, is not to be regarded as a component of the apparatus 1. The user, in particular athlete, can introduce the container 600 which is removable from/out of the apparatus into or in the apparatus 1 prior to selecting a beverage, said container in particular being in the form of a reusable drinking bottle, plastic or glass tumbler or cup, or the apparatus 1 provides a single-use container in the course of preparing the beverage, in particular a paper or plastic cup, or a reusable container of the type described above.

The first container 200 is filled with a pourable substrate 210, in particular a proteinaceous powder. The pourable substrate 210 is fed to the mixing device 100 by a first supply device 220. In the embodiment depicted in FIG. 1, the first supply device 220 is composed of an in particular actively driven, preferentially electrically driven, conveyor screw arranged inside the first container 200 and a powder chute which provides a connection between the first container 200 and the mixing device 100. The powder chute can thereby be configured to be open at the top or closed at the top, in particular in the form of a tube or hose section.

The second containers 300 are filled with at least substantially liquid substrates 310, in particular syrups of different flavors for adapting the taste of the finished beverage. The second containers 300 are each at least indirectly connected to the mixing device by their own respective second supply device 320, in particular via a joint dosing unit 330. The second supply devices 320 can comprise passive components such as for example tubes and/or hoses, and/or active components (not shown) such as for example valves, gates or conveyor devices, in particular pumps, screw conveyors or the like.

In accordance with the embodiment depicted in FIG. 1a, all of the second supply devices 320 are connected to the mixing device 100 by one joint dosing unit 330. This permits all the at least substantially liquid substrates 310 which are available to be provided in a space-saving manner at, in particular above, the mixing device 100. A further advantage of this structure lies in being able to clean all the outlets of the at least substantially liquid substrates 310 at one time by cleaning only one component; i.e. the joint dosing unit 330, which makes for very efficient cleaning.

A carrier liquid 410, in particular tap or mineral water, is stored in storage receptacle 400. The storage receptacle 400 is connected to the mixing device 100 via a third supply device 420, whereby the latter comprises a tube or hose section 422 which in particular empties into the mixing device 100. The third supply device 420 can comprise passive components such as for example tubes and/or hoses, and/or active components (not shown) such as for example valves, gates or conveyor devices, in particular pumps, screw conveyors or the like. Alternatively and/or additionally to the embodiment as depicted, the third supply device 420 can also be connected to a water supply (not shown) instead of the storage receptacle 410.

The mixing device 100 of the embodiment depicted in FIG. 1 is composed of a collecting section 110, a mixing section 120 and a dispensing section 130. The collecting section is provided to bring the pourable substrate 210, the at least substantially liquid substrate 310 and the carrier liquid 410 together. This is effected in the present case by the mixing device 100 being of funnel-shaped configuration, whereby the pourable substrate 210, the at least substantially liquid substrate 310 and the carrier liquid 410 are fed to the mixing section 120 together. Preferentially, the carrier liquid 410 is fed to the mixing device 100 at least substantially laterally; i.e. at least substantially parallel to an inner surface of the mixing device 100 in order to at least encourage the formation of a carrier liquid vortex.

The mixing section 120 is provided to mix the pourable substrate 210, the at least substantially liquid substrate 310 and the carrier liquid 410 into the in particular at least substantially homogeneous beverage. The mixing device 100, in particular mixing section 120, comprises an in particular electrically driven mixing body 125 to this end, which is selected from among a group comprising: a propeller, a mixer wheel and/or a bladed mixing cone.

After being mixed, the at least substantially homogeneous beverage mixed in the mixing section 120 passes, in particular passively, particularly utilizing the force of gravity, into the dispensing section 130 which is provided to dispense the in particular at least substantially homogeneous beverage to the dispensing device 500. In accordance with the embodiment depicted in FIG. 1, the dispensing section 130 is formed by a tube and/or hose section which is molded onto the mixing section 120.

The dispensing device 500 performs any post-preparation of the beverage that may be needed and controls its dispensing to the container 600 which is in particular removable from and/or out of the apparatus. The dispensing device can comprise passive components such as, for example, funnels, nozzles, tubes or hoses and/or active components such as, for example, valves, gates, foaming devices or conveyor devices, in particular pumps, screw conveyors or the like, and/or cleaning devices. In the embodiment depicted in FIG. 1, the dispensing device 500 in particular serves the hygiene of the dispensing area, for example by preventing drops and/or splashes of the beverage in a dispensing area (not shown) of the apparatus 1 by an appropriately configured nozzle and/or a separate cleaning device.

FIG. 1b shows a highly schematic view of a further embodiment of the above-described inventive apparatus 1 for preparing a beverage, in particular for preparing a protein-containing mixed beverage. The FIG. 1b embodiment largely corresponds to that of FIG. 1a, hence apart from the following differences indicated for FIG. 1b, the remarks made above are equally applicable.

The FIG. 1b embodiment substantially differs from the FIG. 1a embodiment in that the at least substantially liquid substrate 310 is not directly supplied to the mixing device 100 but rather indirectly by means of the tube or hose section 422 of the third supply device 420. The at least substantially liquid substrate 310 is thereby injected into the tube or hose section 422 via the at least one second supply device 320. In accordance with the embodiment depicted in FIG. 1b, each of the second containers 300 are fluidly connected to the joint dosing unit 330 by their own respective second supply device 320. The joint dosing unit 330 is fluidly connected to the tube or hose section 422 via a respective separate feed line and/or separate feed tube per each at least substantially liquid substrate 310.

FIGS. 2 and 3 relate to a further embodiment of the apparatus 1. The apparatus 1 here comprises two first containers 200. As opposed to the embodiment described above, the chute 220a is arranged external of the first container 200. The first container 200 is set onto, in particular screwed onto, the supply device 220 in order to enable a transfer of substrate to the mixing device 100. According to one implementation, the first supply device 220 can be extracted from the apparatus together with an empty first container 200 in the course of a refilling process, separated from the apparatus 1 once external of same, connected to a full first container 200 external of the apparatus 1 in order to then be re-inserted with same back into the apparatus 1 again. As can be seen in FIG. 3, a chute 220a can be swivel-mounted on the first supply device 220 so as to e.g. provide a locking mechanism for the above-described refilling process.

FIG. 4 shows a front view (right) and a side view (left) of a first supply device 220 pursuant to one possible implementation of the present invention.

The first supply device 220 comprises a chute 220a (not shown in FIG. 4), a screw conveyor 220b, an interior floor 220c, a bendable agitator element 220d, an impeller 220e of the agitator element 220d, a spindle 220f of the impeller 220e as well as a drive device 220g of the screw conveyor 220b.

The impeller 220e rotates about the spindle 220f which is mounted, in particular rotatably, on an element of the first supply device 220. The impeller 220e is in engagement with the screw conveyor 220b so that the impeller 220e is driven by the screw conveyor 220b which is set into rotation by the drive device 220g. An agitator element 220d, in particular comprising a bendable rod, in particular a metal rod or spring rod, is arranged on the impeller 220e in at least one radial direction of extension. The movement of the impeller 220e moves the agitator element 220d within the first container 200 and/or within the first supply device 220 so as to loosen the pourable substrate and/or convey it out of the corners and/or convey it from the interior floor 220c up to the screw conveyor 220b.

FIG. 5 shows a flow chart of the inventive method for preparing the beverage, in particular the protein-containing mixed beverage, and in particular for realization in the apparatus 1 of the above-described type, comprising the following steps:

In step S100, the carrier liquid 410, the pourable substrate 210 and the at least substantially liquid substrate 310 are provided.

In step S200, the carrier liquid 410, the pourable substrate 210 and the at least substantially liquid substrate 310 are fed to the mixing device 100.

In step S300, the mixing device 100 mixes the carrier liquid 410, the pourable substrate 210 and the at least substantially liquid substrate 310 into the particularly at least substantially homogeneous beverage.

In step S400, the particularly at least substantially homogeneous beverage is dispensed.

In the method as described here, it is possible for in particular at least steps S200 and S300 to be performed sequentially or in parallel or in alternating sub-steps or in any combination.

FIG. 6 shows an exploded view of one embodiment of an apparatus for the storage and supply of a pourable substrate 2, which is shown in FIG. 7 in a sectional view in the assembled state, wherein the superimposition of a chute or powder chute 220a has been dispensed with in both respective illustrations.

The apparatus for the storage and supply of a pourable substrate 2 comprises a first container 200 and a first supply device 220.

The container 200 has a mechanical interface 200a in the form of an external thread arranged around an outlet of the first container, in particular formed in one piece with same.

The first supply device 220 comprises: a housing 222, a housing cover 222a, a mechanical seating 226 and fastener elements 224, 224a.

The housing 222 exhibits an outlet 228 at which a powder chute 220a (not shown in FIGS. 6 and 7) is disposed in the installed state, in particular mounted and/or attached and/or inserted.

A mechanical seating 226, in particular in the form of an internal threaded ring, is arranged, in particular screwed onto the housing cover 222a, in particular screwed on by means of the fastener elements 224. It is obvious that the mechanical seating 226 can also be affixed to the housing cover 222a in a different way, for example by cementing, riveting, welding, soldering, clipping, flanging or the like. According to another not-depicted implementation, the mechanical seating 226 is formed in one piece with the housing cover 222a.

The housing cover 222a is, in particular after being connected to the mechanical seating 226, disposed on the housing 222, in particular screwed on, in particular screwed on by means of the fastener elements 224a. It is obvious that the housing cover 222a can also be affixed to the housing 222 in a different way, for example by cementing, riveting, welding, soldering, clipping, flanging, etc.

The first container 200 is brought into, in particular detachable, engagement with the first supply device 220 by means of its mechanical interface, in particular the first container 200 is screwed into the first supply device 220 and/or the first supply device 220 is screwed onto the first container 200.

FIGS. 8 and 9 each show a respective schematic view of one implementation of the interior of the apparatus for preparing a beverage 1. Two apparatus for storing and supplying a pourable substrate 2 are arranged within the apparatus for preparing a beverage 1. They are each connected via a respective chute or powder chute 220a, in particular connected to the mixing device 100 (not shown in FIGS. 8 and 9).

As FIG. 9 shows, further pourable substrates can be provided in addition to the two apparatus for storing and supplying a pourable substrate 2 within the apparatus for preparing a beverage 1, in particular so as to supply nutritional supplements, particularly vitamin and/or mineral mixtures or the like, in particular upon customer request.

FIGS. 10 to 10b show a schematic view of a further implementation of the interior of the apparatus for preparing a beverage 1.

The pourable substrate 210 is fed to the mixing device 100 by at least one of the two first supply devices 220. The carrier liquid 410, in particular water or milk or mixtures thereof, is fed to the mixing device 100 via a hose section 422 of the third supply device 420. The carrier liquid is thereby supplied at least substantially horizontally on one side of the funnel-shaped collecting section 110 in order to at least encourage, in particular effect, a vortex-like liquid flow in same.

Each of the second containers 300 has its own second supply device 320, in particular in the form of a pump. In accordance with the implementation of FIGS. 10 to 10b, the second supply devices 320 feed the at least substantially liquid substrate 310 to a joint dosing unit 330 which is integrated into the hose section 422 of the third supply device 420. In other words: At least a pre-mixing occurs, in particular an extensive mixing, in particular an at least substantially complete mixing, of the carrier liquid 410 and at least one of the at least substantially liquid substrates 310 prior to the carrier liquid 410 reaching the mixing device 100.

The at least substantially complete mixing of pourable substrate 210, at least one at least substantially liquid substrate 310 and the carrier liquid 410 into a mixture occurs in the mixing section 120 and is conducted into the dispensing section 130.

A dispensing device 500, particularly an in particular flexible hose section 502 of same, is fluidly connected to the dispensing section 130 which feeds the mixture into a container 600 able to be removed from the apparatus.

The dispensing device 500 further comprises a swivel arm 504 to which the end of the hose section 502 facing the container 600 is attached. Prior to the start of the dispensing process and/or after the dispensing process has ended, the swivel arm 504 swings the end of the hose section 502 connected to same in an at least substantially horizontal plane in order to prevent contamination to a dispensing area in which the container 600 is located during dispensing, in particular due to drips, pre-flow, post-flow and/or cleaning fluid. Preferentially, the respective end of the hose section 502 is moved over a containment device 503 which can discharge the fluid it collects to a container integrated into the apparatus and/or a waste water connection.

As already outlined above with respect to FIG. 9, the apparatus can likewise comprise at least one further first container 200b in which at least one further pourable substrate is provided, in particular so as to supply nutritional supplements, particularly vitamin and/or mineral mixtures or the like, in particular upon customer request. This is depicted in greater detail in FIGS. 10 to 10b.

The further first container 200b of the embodiment of FIGS. 10 to 10b is connected to a further, in particular separate mixing device 100a via a first, in particular separate supply device 220h in substrate-conveying manner as described above. Further second containers 300a with further at least substantially liquid substrates 310a, are allocated, in particular exclusively, to the further mixing device 100a.

As described above, each of the further second containers 300a have a further, in particular separate, second supply device 320a, in particular in the form of a pump. According to the implementation of FIGS. 10 to 10b, the further second supply devices 320a feed the further at least substantially liquid substrate 310a to a further joint dosing unit 330a which is integrated into a further hose section 422a of a further third supply device 420a. In other words: Also in the context of the further pourable substrate, at least a pre-mixing already occurs, in particular an extensive mixing, in particular an at least substantially complete mixing, of carrier liquid 410 and at least one of the further at least substantially liquid substrates 310a prior to the carrier liquid 410 reaching the further mixing device 100a.

The further mixing device 100a at least substantially corresponds structurally and functionally to the mixing device 100 described above such that the remarks made on same also apply to the further mixing device 100a.

The dispensing device 500, particularly a further in particular flexible hose section 502a of same, is fluidly connected to the further dispensing section 130a which feeds the mixture into a container 600 able to be removed from the apparatus.

The further hose section 502a is likewise attached to the swivel arm 504 and is pivoted together with the hose section 502 prior to the start of the dispensing process and/or after the dispensing process has ended so as to prevent contamination in the manner as described above.

Particularly ascertainable from FIG. 10b, which is a tilted view of FIG. 10a, is how the dosing unit 330, or the further dosing unit 330a respectively, is integrated into a component of the third supply device 420, respectively the further third supply device 420a, in particular a hose section of same.

Moreover ascertainable from FIG. 10b is the swinging of the swivel arm 504 from the forward dispensing position to the rearward implied cleaning and/or home position and back.

FIG. 11 shows a highly schematic view of part of a further embodiment of the described inventive apparatus. As already outlined above with respect to FIGS. 2 and 3, the chute 220a can be swivel-mounted to the first supply device 220 so as to for example provide a locking mechanism for the above-described refilling process. During such pivoting of the chute 220a from a closed position (FIG. 11, right) into an open position (FIG. 11, left), a volume of pourable substrate 210 can undesirably pass into the collecting section 110 and/or the mixing section 120, which can lead to clogging the mixing section 120. Hence, this embodiment provides for a sensor device S, in particular in the form of an optical induction switch, which detects a respective pivoting of the chute 220a, whereupon a flushing procedure is initiated, in particular by means of the third supply device 420 which supplies the carrier liquid 410, particular water, so as to at least substantially avoid, in particular prevent, clogging.

FIG. 12 shows a schematic view of a further implementation of the apparatus for the storing and supplying of a pourable substrate 2. The structure of the apparatus for storing and supplying a pourable substrate 2 was already described above in particular in regard to FIGS. 6 and 7, which is why so as to avoid repetition, reference is only made to the above remarks, these having exactly the same extent of applicability, mutatis mutandis, to the present embodiment.

The embodiment of FIG. 12 additionally comprises an opening 229 (depicted by dots in FIG. 12) on one side of the housing 222 of the first supply device 220. It is provided, in particular configured to, particularly in the removed state, at least substantially completely purge the supply device 220 of pourable substrate 210 located within said supply device 220. To prevent the infiltrating of contaminants and/or moisture, the opening 229 can at least intermittently and/or partially be closed by a cover 229a, in particular when the apparatus for storing and supplying a pourable substrate 2 is situated within the apparatus 1 for preparing a beverage, in particular for preparing protein-containing mixed beverage, in the installed position.

LIST OF REFERENCE NUMERALS 1 apparatus for preparing a beverage, in particular for preparing a protein-containing beverage
2 apparatus for storing and supplying a pourable substrate
100 mixing device
100a further mixing device
110 collecting section
120 mixing section
125 mixing body
130 dispensing section
130a further dispensing section
200 first container
200a mechanical interface
200b further first container
210 pourable substrate
220 first supply device
220a chute
220b screw conveyor
220c interior floor
220d agitator element
220e agitator element impeller
220f impeller spindle
220g drive device
220h further first supply device
222 housing
222a housing cover
224 fastener element
224a fastener element
226 mechanical seating
228 outlet
229 opening
229a cover
300 second container
300a further second container
310 at least substantially liquid substrate
310a further at least substantially liquid substrate
320 second supply device
320a further second supply device
330 dosing unit
330 further dosing unit
400 storage receptacle
410 carrier liquid
420 third supply device
420a further third supply device
422 tube or hose section
422a further tube or hose section
500 dispensing device
502 tube or hose section
502a further tube or hose section
503 containment device
504 swivel arm
600 container removable from/out of apparatus
S sensor device
S100 provision
S200 supply
S300 mixing
S400 dispensing

What is claimed is:

1. An apparatus for storing and supplying a pourable substrate, for use in an apparatus for preparing a beverage, comprising:
at least one first container for storage of a pourable substrate, wherein the at least one first container comprises a mechanical interface; and
at least one first supply device which is provided to supply a mixing device with the pourable substrate from the at least one first container,
wherein the at least one first supply device comprises:
a housing;
a mechanical seating which is arranged in and/or on the housing and which is releasably connected to the mechanical interface of the first container, wherein the mechanical seating and the mechanical interface together form a threaded connection; and
a conveyor device which is arranged in and/or on the housing, wherein the conveyor device is provided to supply the mixing device with the pourable substrate.

2. The apparatus for storing and supplying a pourable substrate according to claim 1, wherein the conveyor device comprises a passive conveyor device.

3. The apparatus for storing and supplying a pourable substrate according to claim 1, wherein the conveyor device comprises an active conveyor device, wherein the active conveyor device comprises a component selected from among a group consisting of a conveyor screw, a conveyor belt, a hose pump, a pneumatic conveyor device, a suction conveyor device, a vacuum conveyor device, and a blower device.

4. The apparatus for storing and supplying a pourable substrate according to claim 2,
wherein the passive conveyor device comprises a component formed as a component selected from a group comprising a powder chute, a chute, a hose section, or a tube section; and/or
wherein the first supply device further comprises an active conveyor device which is at least partly arranged within the housing and which is provided to supply the pourable substrate to the passive conveyor device, wherein the active conveyor device comprises a component formed as a component selected from among a group comprising a conveyor screw, a conveyor belt, a hose pump, a pneumatic conveyor device, a suction conveyor device, a vacuum conveyor device, or a blower device.

5. The apparatus for storing and supplying a pourable substrate according to claim 1, wherein the pourable substrate is a protein-containing substrate and a liquid substrate is a protein-free substrate.

6. The apparatus for storing and supplying a pourable substrate according to claim 1, wherein the pourable substrate has a protein content of at least 20% by weight.

7. The apparatus for storing and supplying a pourable substrate according to claim 1, wherein the pourable substrate provides a consistent flavor base and a liquid substrate provides a variation of the taste.

8. The apparatus for storing and supplying a pourable substrate according to claim 1, wherein the at least one first supply device has an opening on a side of the housing, which is configured so as to discharge, out of the at least one first supply device, all of the pourable substrate located within the at least one first supply device.

9. A method for assembling the apparatus for storing and supplying the pourable substrate of claim 1 and for mounting the apparatus into an apparatus for preparing a beverage, comprising the steps:
mechanically and releasably connecting the at least one first container for storage of the pourable substrate to the at least one first supply device which is configured to supply the mixing device with the pourable substrate from the at least one first container, thereby forming the threaded connection;
inserting an assemblage comprising the at least one first container and the first supply device into the apparatus for preparing a beverage; and
affixing the conveyor device to the at least one first supply device for connecting the assemblage to the apparatus for preparing a beverage.

10. The apparatus of claim 1 for storing and supplying a pourable substrate, further comprising:
at least one second container for storing a liquid substrate;
at least one second supply device which is provided to supply the mixing device with the liquid substrate from the at least one second container;
a third supply device which is provided to supply the mixing device with a carrier liquid;
a dispensing device which is provided to dispense the beverage to a container able to be removed from/out of the apparatus, and
wherein the mixing device is provided to mix the pourable substrate and the liquid substrate with the carrier liquid into a homogeneous beverage and dispense it to the dispensing device.

11. The apparatus according to claim 10, wherein the apparatus is automated to control the at least one first supply device, the at least one second supply device, and the third supply device to start a feed of the carrier liquid and a feed of the liquid substrate before a feed of the pourable substrate is started.

12. The apparatus according to claim 10, wherein the mixing device comprises:
a collecting section which is provided to bring together the pourable substrate, the liquid substrate and the carrier liquid;
a mixing section which is provided to mix the pourable substrate, the liquid substrate and the carrier liquid into the homogeneous beverage; and
a dispensing section which is provided to dispense the homogeneous beverage into the dispensing device.

13. The apparatus according to claim 10, wherein the mixing device and the dispensing device are separated from each other by a valve which has at least one open position and one closed position.

14. The apparatus according to claim 10, wherein the at least one first supply device comprises a component formed as a component selected from a group comprising a screw conveyor, a powder chute, a conveyor belt, a hose pump, a pneumatic conveyor device, a suction conveyor device, a vacuum conveyor device, or a blower device.

15. The apparatus according to claim 10, wherein the carrier liquid has a water content of between 50% and 100% by weight and/or a milk content of between 0% and 100% by weight.

16. The apparatus according to claim 10, wherein the third supply device is connected to a drinking water supply and/or reservoir.

17. The apparatus according to claim 10, wherein the mixing device comprises one or more mixers selected from among a group comprising: a propeller, a mixer wheel, or a bladed mixing cone.

18. The apparatus according to claim 10, wherein the mixing device is configured to produce a carrier liquid vortex to which the pourable substrate and/or the liquid substrate is fed.

19. The apparatus according to claim 10, wherein the apparatus comprises 2, 3, 4, 5, 6, 7, 8, 9 or more of the at least one second containers and 2, 3, 4, 5, 6, 7, 8, 9 or more of the at least one second supply devices, and wherein at least two of the at least one second supply devices are connected together by a joint dosing unit.

20. The apparatus according to claim 10, wherein the pourable substrate is a protein-containing substrate and the liquid substrate is a protein-free substrate.

21. The apparatus according to claim 10, wherein the pourable substrate has a protein content of at least 20% by weight.

22. The apparatus according to claim 10, wherein the pourable substrate provides a consistent flavor base and the liquid substrate provides a variation of the taste.

23. The apparatus according to claim 10, wherein the at least one second supply device is provided to feed the liquid substrate to the mixing device via at least one component of the third supply device.

24. The apparatus according to claim 10, further comprising a sensor device which is configured to detect a position and/or a change in position of at least one element of the at least one first supply device.

25. The apparatus according to claim 10, wherein the at least one first supply device has an opening on a side of a housing which is configured such that the at least one first supply device is purged of the pourable substrate located within the at least one first supply device.

26. An apparatus for preparing a beverage, comprising the apparatus for storing and supplying a pourable substrate according to claim 1.

* * * * *